United States Patent
De Bellis

(10) Patent No.: US 12,510,501 B2
(45) Date of Patent: Dec. 30, 2025

(54) MEASUREMENT SYSTEM AND METHOD OF ELECTRIC PERMITTIVITY AT 0 HZ

(71) Applicant: Università degli Studi di Roma "La Sapienza", Rome (IT)

(72) Inventor: Giovanni De Bellis, Rome (IT)

(73) Assignee: UNIVERSITA DEGLI STUDI DI ROMA "LA SAPIENZA", Rome (IT)

( * ) Notice: Subject to any disclaimer, the term of this patent is extended or adjusted under 35 U.S.C. 154(b) by 237 days.

(21) Appl. No.: 18/565,954

(22) PCT Filed: Jun. 1, 2022

(86) PCT No.: PCT/IB2022/055112
§ 371 (c)(1),
(2) Date: Nov. 30, 2023

(87) PCT Pub. No.: WO2022/254350
PCT Pub. Date: Dec. 8, 2022

(65) Prior Publication Data
US 2024/0272109 A1  Aug. 15, 2024

(30) Foreign Application Priority Data
Jun. 1, 2021  (IT) .................... 102021000014354

(51) Int. Cl.
G01N 27/22  (2006.01)
G01N 11/14  (2006.01)
(52) U.S. Cl.
CPC ......... *G01N 27/221* (2013.01); *G01N 11/142* (2013.01)

(58) Field of Classification Search
CPC ..... G01N 27/221; G01N 11/142; G01N 27/04
See application file for complete search history.

(56) References Cited

U.S. PATENT DOCUMENTS

| 5,279,149 A | * | 1/1994 | Williams | ............... G01N 11/00 73/54.01 |
| 2009/0293595 A1 | | 12/2009 | Hayashi | |

FOREIGN PATENT DOCUMENTS

| DE | 102011001244 A1 | 9/2012 |
| JP | 2009115747 A | 5/2009 |

OTHER PUBLICATIONS

Anonymous: "Electrorheology", Anton Paar Aug. 2, 2020 Retrieved from the internet URL:https://web.archive.org/web/20200802141207/https://www.anton-paar.com/corp-en/products/details/electrorheology/.

(Continued)

*Primary Examiner* — Amy He

(57) ABSTRACT

A measurement method (100) of the electric permittivity ($\varepsilon$) at 0 Hz of a substance (1), irrespective of the aggregation state, comprising the steps of: pre-arranging (101) a rheometer (2) comprising an electrorheology module (20), provided with a fixed first plate (21) and said movable second plate (22); connecting (102) a voltage generator (3) to said rheometer (2); placing (103) the substance (1) between said first plate (21) and said second plate (22); arranging (104) said second plate (22) at a distance (D) from said first plate (21); imposing (105) said potential difference ($\Delta V$) at 0 Hz between said first plate (21) and said second plate (22); measuring (106) a normal force (F) to which said second plate (22) is subjected; converting (108) the normal force (F) to obtain the dielectric permittivity ($\varepsilon$) of the substance (1).

15 Claims, 13 Drawing Sheets

(56) References Cited

OTHER PUBLICATIONS

International Search Report and written opinion issued by the EPO on Sep. 19, 2022 for corresponding PCT/IB2022/055112.

* cited by examiner

MEASUREMENT SYSTEM AND METHOD OF ELECTRIC PERMITTIVITY AT 0 HZ

CROSS-REFERENCE TO RELATED APPLICATION(S)

This application is a U.S. national stage application of PCT/IB2022/055112 filed on 1 Jun. 2022, which claims priority to and the benefit of Italian Application No. 102021000014354, filed 1 Jun. 2021 the contents of each of which are incorporated herein by reference in their entireties.

FIELD OF THE INVENTION

The present invention relates to a measurement method and system of the electric permittivity of a substance at 0 Hz. In particular, the present invention concerns a measurement method and system of the DC electric permittivity, regardless of the state of aggregation of the substance itself.

KNOWN PRIOR ART

By electric permittivity is meant the tendency of a substance to counteract an electric field to which it is subjected. The electric permittivity of a substance is also called dielectric constant and is typically denoted by the symbol $\varepsilon$. Generally, the electric permittivity is described by the relation $\varepsilon = \varepsilon_0 \varepsilon_r$, where $\varepsilon_0 = 8,9 \cdot 10^{-12}$ $C^2/(N \cdot m^2)$ is the dielectric constant of vacuum and $\varepsilon_r$ is a pure number called the relative dielectric constant of the substance.

The permittivity of a substance is, moreover, strongly related to its electrical susceptibility, that is, the predisposition of the substance to polarize when subjected to an electric field.

It is well known that the electric permittivity of a substance varies as the frequency of the electric field to which the substance is subjected varies. Such dependency is generally described by using the complex permittivity, which also represents the phase shift between the polarization of the substance and the external electric field.

In the state of the art several systems and methods for determining the electric permittivity of a substance are known.

The selection of the type of technique to be used for measuring the electric permittivity is dictated mainly by two factors: the type of substance being analyzed and the frequency range of interest.

In the high-frequency range, non-resonant techniques are preferred, based on reflection-transmission measurements of the electromagnetic wave incident on the sample, which allow measuring the dielectric characteristics over more or less wide frequency ranges. In such category the measurement techniques with coaxial probe, the waveguide measurements and free-space measurements are included.

For low to medium frequencies, however, the so-called resonant methods prevail. Typically, such techniques only allow measurements on single frequencies or at discrete frequencies. Among the known techniques, only the so-called flat-plate capacitor method allows the measurement of the capacitive type of the dielectric constant, up to frequencies of about 20 Hz, generally by the use of an impedance analyzer or LCR meter. This method requires extremely planar samples and is affected by measurement errors that are difficult to control.

Some descriptions of the methods available to date, with related fields of application and advantages, are described in the following scientific articles:

U. Kaatze, "*Measuring the dielectric properties of materials. Ninety-year development from low-frequency techniques to broadband spectroscopy and high-frequency imaging,*" Meas. Sci. Technol., vol. 24, no. 1, 2013;

M. Khan e S. Ali, "*A brief review of measuring techniques for characterization of dielectric materials,*" Int. J. Inf. Technol. Electr. Eng., vol. 1, no. 1, 2012;

O. V. Tereshchenko, F. J. K. Buesink, e F. B. J. Leferink, "*An overview of the techniques for measuring the dielectric properties of materials,*" 2011 30th URSI Gen. Assem. Sci. Symp. URSIGASS 2011, pp. 1-4, 2011.

Thus, from the above, it is evident that accurate methods for measuring the permittivity of a substance in pure DC, i.e., at frequencies substantially equal to 0 Hz, are not reported in the literature.

Indeed, it is noted that attempts have been made in the past to measure the electric permittivity of a substance at 0 Hz, mainly by using parallel flat-plate capacitors between which the substance, whose DC dielectric constant is to be determined, is interposed. However, such methods stand out for the low accuracy and reliability of the detected quantities.

The analysis of the known art shows that the known techniques have several drawbacks.

In the first instance, there are no methods and/or systems able to make accurate and reliable measurements of the electric permittivity of a substance at 0 Hz.

Furthermore, the techniques used to date do not allow a single instrumentation architecture to be used to measure the electric permittivity of substances that occur in different states of aggregation. In fact, it is not possible to perform, with a single instrument/system, the measurement of the electric permittivity of substances that occur in the solid, liquid and aeriform state. To date, dedicated setups are available for a single state of aggregation, which therefore do not allow measurements to be made on substances that occur in different states of aggregation.

The known techniques also stand out for the particularly long measurement timelines, typically exceeding 10 minutes. Such timelines are excessive, especially when the measurement requires repeated trials and a change in settings.

Another drawback of the known techniques is related to the difficulty of making measurements at controlled temperatures. In fact, it is known that the electrical behavior of a substance is related to its temperature, which influences the thermal agitation of its atomic components and thus affects its dielectric response. The inability to accurately control the temperature invalidates the quality of the measurements.

Object of the present invention is to solve the drawbacks of the known art. In particular, object of the present invention is to provide an accurate measurement method and system of the electric permittivity of a substance at 0 Hz, which is reliable and independent of its state of aggregation. In other words, the present invention provides a method and system for determining, without modification and in an accurate manner, the DC electric permittivity of a substance that is in a solid, liquid or aeriform state.

Further object of the present invention is to provide a measurement method and system of the electric permittivity of a substance at 0 Hz particularly fast compared to the known techniques.

Still another object of the present invention is to provide a measurement method and system of the electric permittivity of a substance at 0 Hz, with temperature control.

SUMMARY OF THE INVENTION

These and further objects are achieved by the present invention thanks to a measurement method and system of the electric permittivity of a substance at 0 Hz, according to claim 1.

Further features and preferential aspects of the invention are set forth in the dependent claims.

According to a first aspect, the present invention relates to a measurement method of the electric permittivity of a substance at 0 Hz, regardless of its state of aggregation. Specifically, said method allows, without modification, to determine the electric permittivity of a substance at 0 Hz that is in a solid, liquid or aeriform state.

Said measurement method first comprises a step of setting up a rheometer comprising an electrorheology module. The electrorheology module is equipped with a first plate and a second plate, parallel to each other. Specifically, the first plate is fixed relative to the body of the rheometer, preferably integral with the body of the rheometer or attached to a fixed support. The second plate is movable and thus free to be moved closer to, or moved away from, the first plate. Preferably, said first plate and second plate have flat circular shape, that is, they have discoidal shape. According to an embodiment, said first and second plates have different surface areas (in the example of circular-shaped plates, the plates have different radii). According to other embodiments, said first plate and second plate have coinciding surface areas.

Furthermore, the electrorheology module comprises a force sensor. Said force sensor is operationally connected to said second plate and is configured to measure a normal force to which said second plate is subjected. In other words, the force sensor measures the component, along a direction perpendicular to the extension of the second plate, of a force to which the second plate itself is subjected. Specifically, said normal force is parallel to the field lines of an electric field imposed between the aforementioned first plate and second plate, as will become clearer below.

Preferably, said rheometer is a rotational rheometer.

Still preferably, said force sensor is a high-resolution force sensor, for example with a resolution between 0.1 mN and 0.5 mN. According to an embodiment, said force sensor is a load cell. Alternatively, the force sensor can be a piezoelectric cell, a thin-film force sensor, a dynamometer or similar known solutions.

Next, the measurement method comprises a step of connecting a voltage generator to said rheometer. Such voltage generator is configured to impose a potential difference at 0 Hz, that is, DC (direct current), between said first and second plates. Said voltage generator is capable of imposing a voltage in the range between a minimum potential difference and a maximum potential difference.

Next, the measurement method comprises a step of placing the substance whose electric permittivity at 0 Hz is to be measured. Said substance is placed between said first plate and said second plate, preferably in contact with the first plate.

Subsequently, the method comprises a step of arranging said second plate at a known distance from said first plate. In other words, during this step, the second movable plate is moved closer to, or further away from, the first fixed plate so that it is positioned at a desired known distance. Preferably, said first and second plates are placed at a particularly short known distance to the surface area of the aforementioned plates so that the edge effects can be advantageously ignored in performing the measurement method. For example, in the case of circular plates, the ratio of the radius of one of the plates to the known distance is preferably greater than 5, even more preferably greater than 10.

Once the plates are placed at the desired distance, the measurement method comprises a step of imposing a potential difference at 0 Hz between said first plate and said second plate by means of said voltage generator. The voltage generator, which is operationally connected to the first and second plates, is operated so as to impose a potential difference in a range between the aforementioned minimum value and maximum value of voltage that can be imposed. Specifically, the first plate is connected to ground and is therefore at substantially zero potential, while the second plate is brought to a potential substantially equal to the potential difference intended to be imposed between the parallel plates. Once a voltage difference is imposed, an electric field is established between said first plate and second plate, the intensity of which is proportional to the potential difference between the aforementioned plates.

Subsequently, the measurement method comprises a measurement step, by means of the force sensor, of the normal force to which said second plate is subjected. In other words, once the potential difference between the first and second plates is imposed and the electric field is imposed, the second plate is affected by a force, typically an attractive force with respect to the first plate, which can be detected by means of the aforementioned force sensor. The value of such normal force depends on the characteristics of the substance interposed between the first and second plates, as well as on the dimensional characteristics of the electrorheology module and the imposed potential difference, as will become clearer below.

Next, the measurement method comprises a step of converting said normal force to obtain the dielectric permittivity of the substance. Specifically, the converting step allows, by mathematical equations, to obtain the dielectric permittivity of the substance placed between the first and second plates from the normal force detected by the force sensor.

Advantageously, the measurement method outlined so far allows reliable measurements of the electric permittivity of a substance at 0 Hz to be carried out, regardless of the state of aggregation of the substance itself. Specifically, by the present method it is possible to accurately obtain the electric permittivity at 0 Hz of the substance interposed between said first and second plates, which may be in the solid, gaseous or aeriform state.

Still advantageously, the present method allows to obtain particularly quickly the electric permittivity of a substance interposed between the first and second plates. Typically, carrying out the present measurement method requires timelines of less than one minute.

Furthermore, the aforementioned measurement method allows for non-destructive measurements of the substance sample whose electric permittivity is to be known to be carried out. Likewise, the present method does not require arranging electrodes or other sensors in contact with the substance. Such characteristics make the measurement method particularly easy to perform.

According to an embodiment, during the step of arranging said second plate at a known distance from said first plate, the second plate is placed in contact with the substance. In other words, the second plate adheres to the substance interposed between it and the first plate. In such embodiment, in the converting step, the dielectric permittivity of the substance is obtained according to the equation:

$$F = \frac{1}{2} \varepsilon_0 \varepsilon_r S \frac{\Delta V^2}{D^2} \quad \text{(Eq. 1)}$$

where:
- F is the normal force measured by the force sensor;
- $\varepsilon_0$ is the dielectric constant of vacuum equal to $8{,}9 \cdot 10^{-12}$ C$^2$/(N·m$^2$);
- $\varepsilon_r$ is the relative dielectric constant of the substance;
- S is the area of the surface of said second plate;
- $\Delta V$ is the potential difference between said first plate and second plate;
- D is the known distance between first plate and second plate.

The dielectric permittivity of the substance is equal to $\varepsilon_0 \varepsilon_r$, and can be obtained by inverting the Eq. 1, by making explicit the product $\varepsilon_0 \varepsilon_r$.

According to another embodiment, during the step of arranging said second plate at a known distance from said first plate, the second plate is placed not in contact with said substance, thus leaving an air layer, or air cushion, between said substance and said second plate. In other words, in the step of arranging the second plate, there is no adhesion between the second plate and the substance.

In such embodiment, in the converting step, the dielectric permittivity of the substance is obtained according to the equation:

$$F = \frac{1}{2} \varepsilon_0 \varepsilon_{r1}^2 \varepsilon_{r2}^2 S \frac{\Delta V^2}{(\varepsilon_{r2} D1 + \varepsilon_{r1} D2)^2} \quad \text{(Eq. 2)}$$

where:
- $\varepsilon_0$ is the dielectric constant of vacuum equal to $8{,}9 \cdot 10^{-12}$ C$^2$/(N·m$^2$);
- $\varepsilon_{r1}$ is the relative dielectric constant of air equal to 1.000589;
- $\varepsilon_{r2}$ is the relative dielectric constant of the substance;
- S is the area of the surface of said second plate;
- $\Delta V$ is the potential difference between said first plate and second plate;
- D1 is a thickness of said air layer;
- D2 is a thickness of said substance measured in a perpendicular direction to the extension of said first and second plates;

In such embodiment, the known distance between the first and second plates is equal to D1+D2, while the dielectric permittivity is equal to $\varepsilon_0 \varepsilon_{r1}$ and can be obtained by inverting and solving the second-degree equation of Eq. 2.

Note that, herein specific reference is made to an air layer, but the present measurement method is applicable by replacing the air with other aeriform elements or mixtures of aeriform elements whose relative dielectric constant is known.

According to an aspect, the measurement step provides for carrying out repeated measurements for capturing a plurality of samples of said normal force. In other words, the measurement step provides for carrying out multiple measurements of the normal force to which the second plate is subjected. Advantageously, having several samples allows for more reliable measurements. Furthermore, the speed the method is carried out allows significant amounts of normal force samples to be taken in particularly short time intervals compared to the known techniques.

Preferably, the measurement method comprises a step of calculating an average value of at least part of said plurality of samples. Specifically, at least part of the plurality of samples captured during the measurements repeated in the measurement step is averaged during said calculation step to extract an average value. Said average value is representative of the normal force converted during the converting step, i.e. the value of a single measurement is replaced with the average value of multiple measurements, e.g., inside the Eq. 1 or Eq. 2. Advantageously, the presence of a calculation step allows to reduce the inherent error of the measurement by compensating for the over- or under-errors of the individual measurements. Accordingly, the electric permittivity obtained is more accurate than the embodiment with a single measurement.

According to an embodiment, the measurement method provides for varying said potential difference between the first plate and the second plate while performing said repeated measurements. In other words, during the capture of the plurality of samples of the normal force, the potential difference is varied, that is, the voltage generator imposes a variable potential difference between the plates. For example, the voltage generator can impose a first potential difference for a first portion of the plurality of samples of the normal force, a second potential difference for a second portion of the plurality of samples, a third potential difference for a third portion of the plurality of samples, and so on. Advantageously, having multiple force samples captured in response to different voltages allows a greater validation of the calculated electric permittivity measure.

According to an embodiment, the method comprises an additional step of extracting the polarization curve of the substance. In fact, some substances exhibit, in response to the exposure to an external electric field, a residual polarization even when the electric field returns to zero. Such phenomenon is normally called polarization and is represented by means of polarization curves also known as hysteresis curves. The substances belonging to this category are commonly called ferroelectric substances. According to such embodiment, during the measurement step, the potential difference is varied cyclically from a zero potential difference until reaching a potential difference lower than or equal to the maximum potential difference that can be imposed by the voltage generator. Subsequently, the potential difference between the plates is raised to a value greater than or equal to the minimum difference that can be imposed by the voltage generator, and then the cycle is closed back to a zero value of the potential difference. In other words, at least one complete cycle is carried out in the range of potential differences that can be imposed by the voltage generator. Advantageously, the measurement method according to the present invention thus allows to evaluate the polarization curve of a substance, for example, to determine the hysteresis curve of a ferroelectric material. In particular, said step of extracting said polarization curve of the substance provides for calculating a polarization parameter P according to the following relation:

$$P = \varepsilon_0 \left( \frac{\varepsilon}{\varepsilon_0} - 1 \right) E \quad \text{(Eq. 3)}$$

where:
- $\varepsilon_0$ is the dielectric constant of vacuum equal to $8,9 \cdot 10^{-12}\ C^2/(N \cdot m^2)$;
- $\varepsilon$ is the electric permittivity of the substance obtained during the converting step;
- E is an electric field imposed between said first plate and second plate, known as a function of the potential difference $\Delta V$ imposed.

Advantageously, the measurement method also allows the evaluation of the polarization characteristics of a substance with the same architecture used for the evaluation of the electric permittivity.

According to a further aspect, the voltage generator is a voltage generator with feedback current control configured to detect a current flowing in said substance during said measurement step. In other words, the voltage generator comprises a current feedback. According to such aspect, the measurement method comprises a step of deriving an electrical conductivity parameter of the substance according to the following relation:

$$\sigma = \frac{ID}{S\Delta V} \quad \text{(Eq. 4)}$$

where:
- $\sigma$ is the electrical conductivity of the substance;
- I is a current flowing in the substance detected by the voltage generator;
- D is the known distance between said first plate and second plate;
- S is the surface area of said first plate and second plate;
- $\Delta V$ is the potential difference between said first plate and second plate.

Note that to perform a current measurement, the contact between the second plate and the substance to be analyzed is required.

Advantageously, the measurement method further allows the evaluation of the electrical conductivity of a substance with the same architecture used for the evaluation of the electric permittivity.

According to a preferred embodiment, the rheometer is equipped with a temperature control module. Said temperature control module is configured to keep the electrorheology module and the substance at a desired temperature during the measurement step.

Preferably, said temperature control module comprises a Peltier cell operatively connected to said first plate, and a thermostat for controlling the temperature of said Peltier cell. Still preferably, the temperature control module is configured to adjust the temperature of the electrorheology module and the substance in a range between 273.15 K and 473.15 K, corresponding to from 273.15 K (0° C.) to 473.15 K (+200° C.).

Alternatively, the temperature control method may include a resistance system or an induction system.

Advantageously, the presence of a temperature control module allows to monitor the dependency of the electric permittivity of a substance on the temperature of the substance itself. In particular, by the temperature control module, it is possible to assess the dependency of the electric permittivity of the substance on the temperature, that is, to determine the dielectric constant of the substance in relation to the temperature at which the substance itself is. Furthermore, in some cases, it is also possible to determine the Curie temperature of the substance being examined, that is, the temperature at which the transition between the ferroelectric and paraelectric phases of the substance takes place.

In particular, the measured substance must have a ferroelectric nature.

Note how, advantageously, the present system allows a known system to be used for a different purpose, specifically a system for rheometry, that is, for evaluating the flow regime of a substance. It is evident how such systems are not designed to obtain the electrical characteristics of the substances under investigation.

According to a preferred embodiment, said rheometer comprises a Peltier cell operatively connected to the electrorheology module and in which the system comprises a thermostat configured to control the temperature of said Peltier cell.

BRIEF DESCRIPTION OF THE FIGURES

Further aspects and advantages of the present invention will be clear from the following description, that is made by way of example with reference to the attached schematic drawings, wherein.

DESCRIPTION OF SOME EMBODIMENTS

Figure 1:
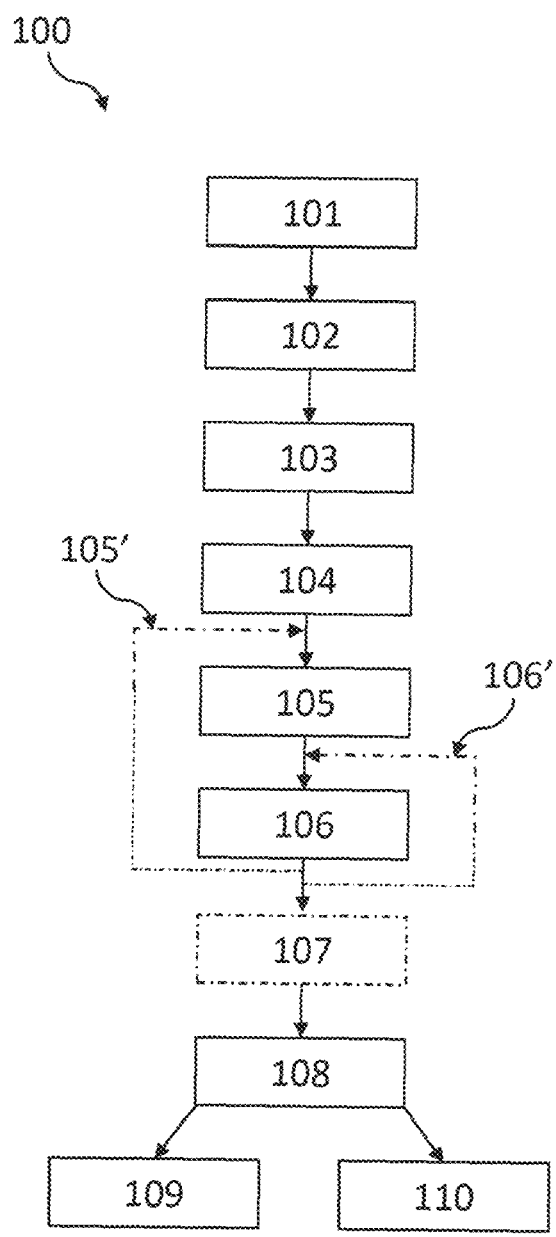
FIG. 1 shows the steps of the measurement method object of the present invention according to a block diagram.

Referring to FIG. 1, a method of measuring an electric permittivity parameter $\varepsilon$ according to the present invention has been denoted by the numeral reference 100.

Figure 2:
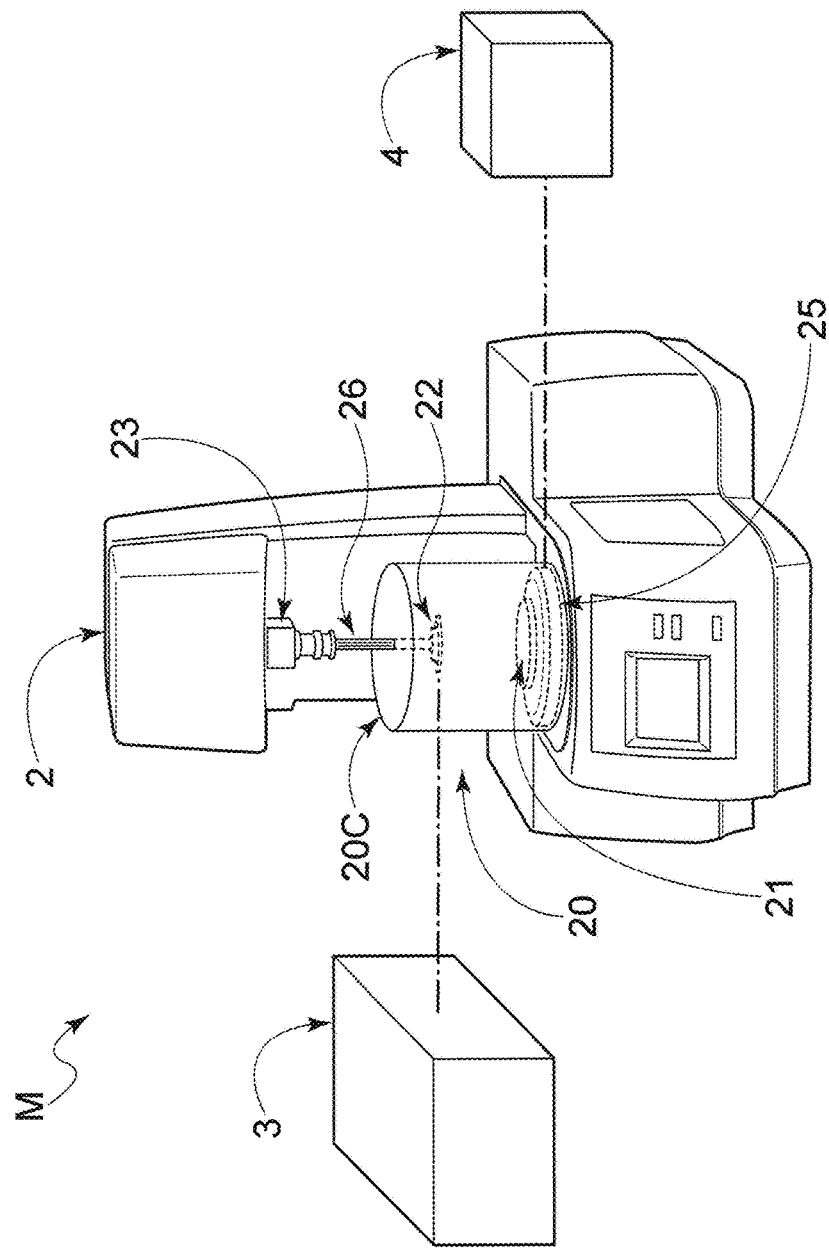
FIG. 2 depicts an embodiment of the measurement system also object of the present invention according to a simplified view.

As shown in FIG. 1, the measurement method 100 comprises first a step 101 of setting up a rheometer 2 comprising an electrorheology module 20. Preferably, the rheometer 2 is a rotational rheometer. Said rheometer 2 is shown in FIG. 2 in the context of a measurement system M, also subject of the present description, and in more detail in FIG. 3.

In the present description reference will be made in an exemplary and by no means limiting way to an Anton Paar© MCR 302 ® rotational type rheometer 2 as the device used for the tests described below. However, it is noted that the present measurement method 100 can be implemented, with the appropriate differences, on electrorheometric measuring devices that have analogous or similar characteristics to the rheometer 2 described below, such as, for example, more basic viscometers than the rheometer set forth below.

Figure 3:
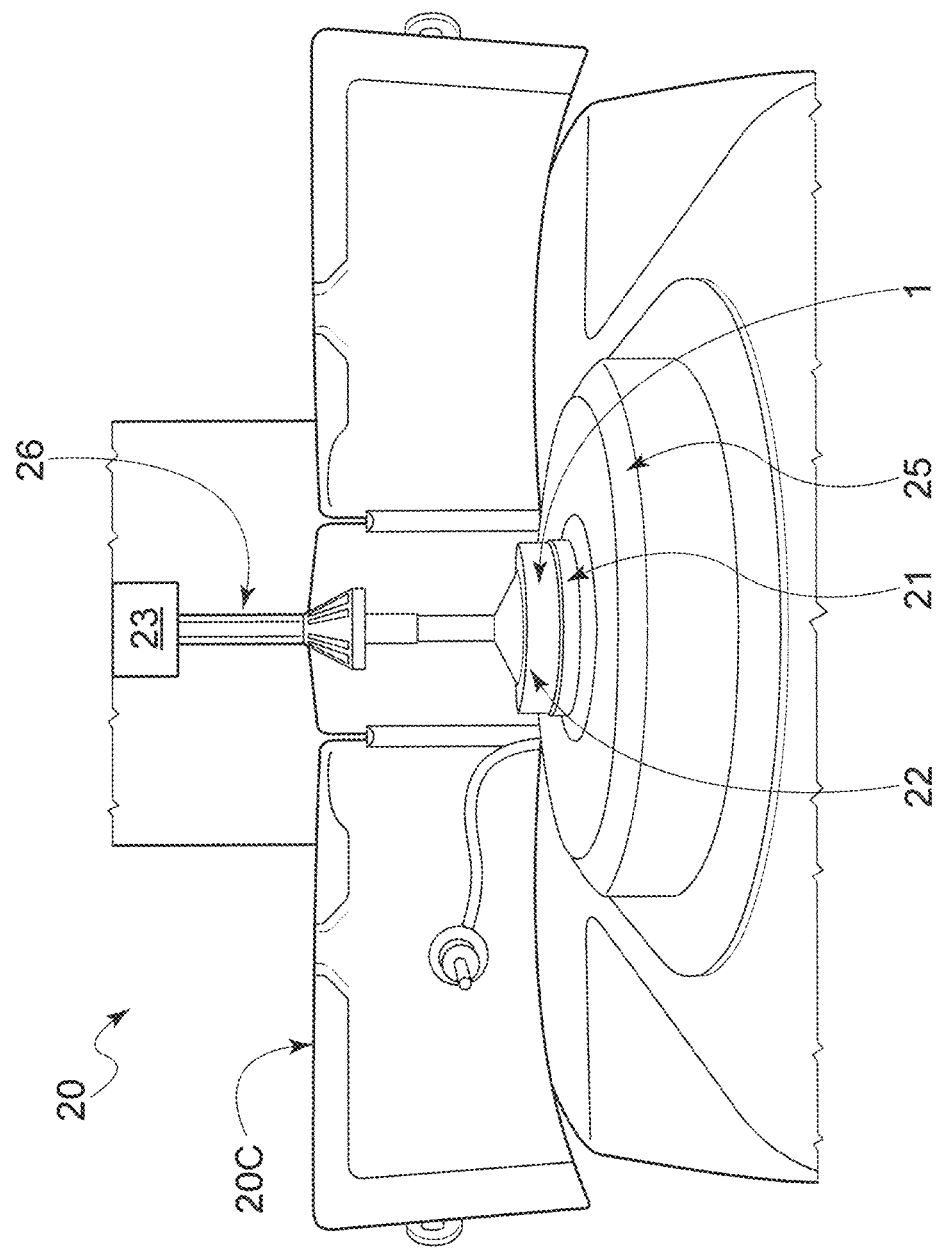
FIG. 3 shows a detail of the measurement system in FIG. 2.

As shown in FIG. 3, the electrorheology module 20 is equipped with a first plate 21 and a second plate 22. Said first plate 21 and second plate 22 are parallel to each other. In the shown embodiment said first plate 21 and second plate 22 have a substantially circular flat shape. In other embodiments, said first and second plates 21 e 22 can take different forms.

According to the embodiment shown and used in carrying out the following tests, said second plate 22 has a surface area S different from that of the first plate 21. Specifically, the first plate 21 has a radius of 57 mm ($57 \times 10^{-3}$ m), which is different from the radius of the second plate 22 which is equal to 50 mm ($50 \times 10^{-3}$ m). According to other embodiments, the first plate 21 and the second plate 22 have the same surface area S. Specifically, the first plate 21 is fixed relative to the body of the rheometer 2, preferably integral with the body of the rheometer 2. The second plate 22 is movable and thus free to be moved closer to, or moved away from, the first plate 21. The rheometer 2 preferably comprises at least one actuator of a known and not shown type for the controlled movement, translation and/or rotation of the second plate 22. Still preferably, said rheometer 2 comprises a computerized control unit, also of a known type and not shown, to control the components of the rheometer 2.

The electrorheology module 20 further comprises a force sensor 23. Said force sensor 23 is operationally connected to said second plate 22 and is configured to measure a normal force F to which said second plate 22 is subjected. In other words, the force sensor 23 measures the component along a direction perpendicular to the extension of the second plate 22 of a force to which the second plate itself is subjected. In particular, said normal force F is parallel to the lines of an electric field E that is applied, as will be shown below, between said first plate and second plate 22.

In the embodiment shown in FIGS. 2 and 3, the second plate 22 is one end of a connecting rod 26 to the body of the rheometer 2. Said force sensor 23 is configured to detect a component of the force to which the second plate 22 is subjected, along an axial direction of the connecting rod 26. Said component is the normal force F.

Preferably, as previously mentioned, said rheometer 2 is a rotational rheometer, that is, said actuator is configured to rotate said second plate 22 by imparting a twisting moment on the connecting rod 26.

According to an embodiment, said force sensor 23 is a force sensor having high precision, preferably with a resolution of 0.5 mN, even more preferably 0.1 mN.

In the shown embodiment related to the Anton Paar© MCR 302 ® rheometer used for the tests shown below, said force sensor 23 is a load cell with 0.5 mN resolution.

As shown in FIGS. 2 and 3, the electrorheology module 20 comprises a cap 20C, which can be opened and closed, adapted to contain inside it said first plate 21 and second plate 22. In FIG. 3 the cap 20C in the open configuration is shown. Advantageously, as will become clearer below, the presence of the cap 20C allows to isolate the measurement environment and make measurements in a controlled environment. In particular, when the cap 20C is closed, it is possible, by means of a specific valve, to flow a gas inside the cap to keep the electrorheology module 20 at a controlled atmosphere. According to an aspect, the gas flowed inside the cap 20C may be the substance 1 whose electric permittivity e is to be measured.

According to what shown in FIG. 1, the measurement method 100 comprises a step of connecting 102 a voltage generator 3 to said rheometer 2. Such voltage generator 3 is configured to impose a potential difference $\Delta V$ at 0 Hz, that is DC (direct current), between said first plate 21 and second plate 22. Said voltage generator 3 is capable of imposing a potential difference $\Delta V$ at 0 Hz in the range between a minimum potential difference $\Delta Vmin$ and a maximum potential difference $\Delta Vmax$.

As shown in FIG. 3, the electrorheology module 20, in particular the cap 20C, comprises a spring contact 27 for an electrical contact between the voltage generator 3 and the second plate 22. Therefore, the voltage generator 3 is configured to bring the second plate 22 to a desired potential while connected to ground, i.e., 0 V.

In the embodiment used for the tests that will be described below, a 3 FUG© HCP 14-12500 voltage generator capable of imposing a unipolar potential difference $\Delta V$ between 0 V ($\Delta Vmin$) and 12.5 kV ($\Delta Vmax$) was used. In alternative embodiments, the voltage generator 3 is a bipolar voltage generator, i.e., capable of reversing the polarity of the potential difference $\Delta V$ imposed between said first plate 21 and second plate 22. In other words, with a bipolar voltage generator 3 it is possible to impose negative $\Delta V$ potential differences between the plates of the rheometer, and thus $\Delta Vmin$ is less than 0 V.

Next, the measurement method 100 comprises a step 103 of placing the substance 1 whose electric permittivity ε at 0 Hz is to be measured. Said substance 1 is placed between said first plate 21 and said second plate 22, preferably in contact with the first plate 21. In other words, the substance 1 is laid on the first plate 21.

Subsequently, the measurement method 100 comprises a step of arranging 104 said second plate 22 at a distance D from said first plate 21. In other words, during this step, the second movable plate 22 is moved closer to, or further away from, the first fixed plate 21 so that it is positioned at a distance D, typically by means of the aforementioned precision actuator.

Preferably, said first plate 21 and second plate 22 are placed at a particularly short distance D to the surface area S of the aforementioned plates so that, advantageously, the edge effects can be ignored in performing the measurement method 100. For example, in the case of circular plates, the ratio of the radius of the second plate 22 to the distance D is preferably greater than 5, even more preferably greater than 10.

Still preferably, the rheometer 2 comprises a position sensor not shown and typically connected to said precision actuator for moving the second plate 22. Said position sensor is a position sensor having particularly high resolution, so to advantageously ensure a precise adjustment of the distance D between said first plate 21 and second plate 22.

Figure 4:
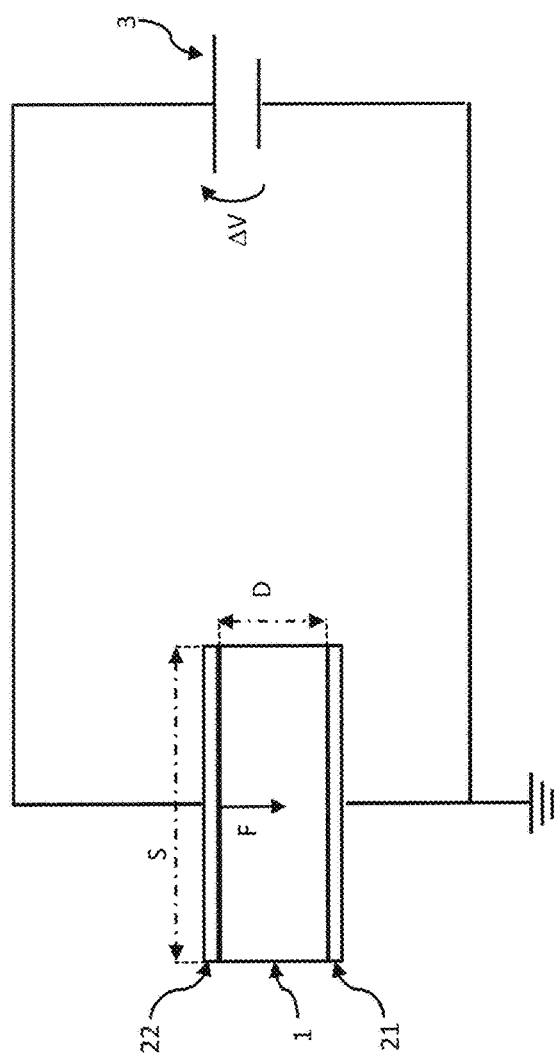
FIG. 4 shows a first configuration of the measurement system in FIG. 2 by means of a circuit block diagram.
Figure 5:
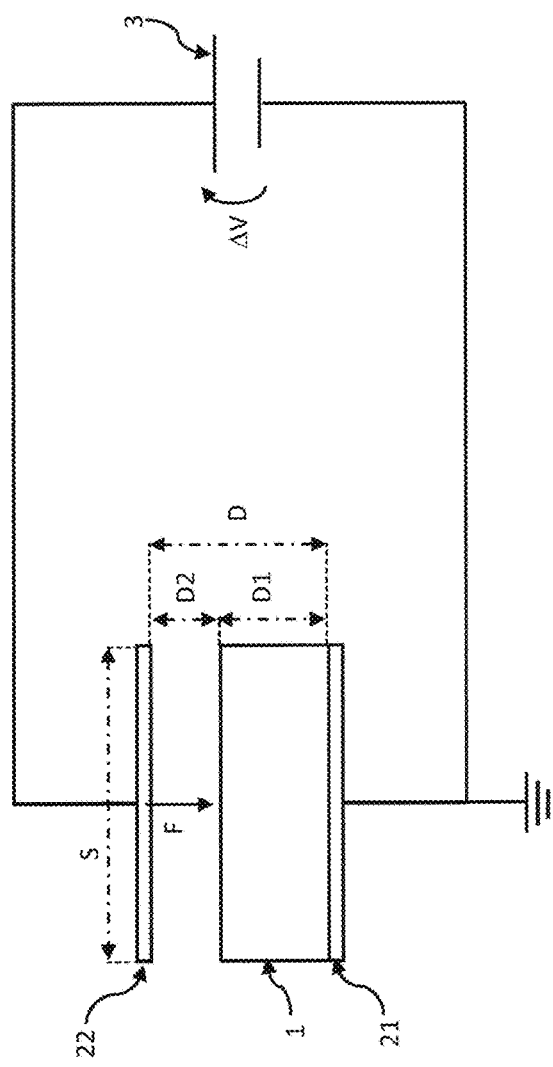
FIG. 5 shows a second configuration of the measurement system in FIG. 2 by means of a circuit block diagram.

According to FIG. 1, the measurement method 100 comprises a step 105 of imposing the potential difference $\Delta V$ at 0 Hz between said first plate 21 and said second plate 22 by means of said voltage generator 3. The voltage generator 3, which is operationally connected to the first plate 21 and second plate 22, is operated so to impose the potential difference $\Delta V$ in a range between the aforementioned minimum value $\Delta Vmin$ and maximum value $\Delta Vmax$ of voltage that can be imposed. Preferably, as shown in FIGS. 4 and 5, the first plate 21 is connected to ground, and is therefore at substantially zero potential, while the second plate 22 is brought to a potential substantially equal to the potential difference ΔV intended to be imposed between the plates of the rheometer 2. Once a potential difference ΔV is imposed, an electric field E is established between said first plate 21 and second plate 22, the intensity of which is proportional to the potential difference ΔV.

Subsequently, the measurement method 100 comprises a measurement step 106, by means of the force sensor 23, of the normal force F to which said second plate 22 is subjected. In fact, once the potential difference ΔV is imposed, the second plate 22 is affected by a force, generally of attractive type to the first plate 21, which can be detected by means of the aforementioned force sensor 23. The value of such normal force F depends on the electric permittivity ε of the substance 1, as well as on the dimensional characteristics of the electrorheology module 20 and the potential difference ΔV, as will become clearer below.

Next, the measurement method 100 comprises a step 108 of converting said normal force F to obtain the dielectric permittivity ε of the substance 1. As described below, the converting step 108 allows, by means of mathematical equations, to obtain the dielectric permittivity ε of the substance 1 from the normal force F detected by the force sensor 23 during the measurement step 106. In other words, during the converting step 108 the electric permittivity ε of the substance 1 is obtained as a function of the measured normal force F.

Preferably, as depicted by the return loop 106' in FIG. 1, the measurement step 106 provides for performing repeated measurements to capture a plurality of samples of said normal force F. In other words, in the measurement step 106, multiple measurements of the normal force F to which the second plate 22 is subjected are repeated.

Preferably, in the embodiments in which a plurality of samples of the normal force F is captured, the measurement method 100 comprises a step of calculating 107 an average value of at least part of said plurality of samples. Said average value is representative of the normal force F to which the second plate 22 is subjected, i.e., the calculated average value is used in place of the single normal force F value measured in the case of a single measurement during the measurement step 106.

Preferably, as depicted by the return loop 105', the measurement method 100 provides for varying said potential difference ΔV between the first plate 21 and the second plate 22 while performing the measurement step 106.

Still preferably, the rheometer 2 is equipped with a temperature control module 4,25. Said temperature control module 4,25 is configured to keep said electrorheology module 20 and said substance 1 at a desired temperature during the measurement step 106. In the embodiments shown, said temperature control module comprises a Peltier cell 25 operatively connected to said first plate 21, specifically arranged in contact with the first plate 21. In such embodiments, the temperature control module preferably comprises a thermostat 4 shown schematically in FIG. 2, configured to control the temperature of said Peltier cell 25. In particular, said Peltier cell 25 and said thermostat 4 are configured to keep the environment inside the cap 20C of the electrorheology module 20 at a desired temperature which can be set between 273.15 K (0° C.) and 473.15 K (+200° C.). The presence of the temperature control module 4,25 allows to investigate the dependency of the electric permittivity ε of the substance 1 as a function of the set temperature and, possibly, to determine the Curie temperature of the substance 1 itself.

According to the embodiment shown in FIG. 4, during the arranging step 104, the second plate 22 is placed in contact with the substance 1, that is, the second plate 22 adheres to the substance 1 interposed between it and the first plate 21. In such embodiment, in the converting step 108 the electric permittivity ε of the substance 1 is obtained according to the equation:

$$F = \frac{1}{2}\varepsilon_0 \varepsilon_r S \frac{\Delta V^2}{D^2} \quad \text{(Eq. 1)}$$

where:
F is the normal force measured by the force sensor 23;
$\varepsilon_0$ is the dielectric constant of vacuum equal to $8{,}9 \cdot 10^{-12}$ $C^2/(N \cdot m^2)$;
$\varepsilon_r$ is the relative dielectric constant of the substance 1;
S is the area of the surface of said second plate 22;
ΔV is the potential difference between said first plate 21 and second plate 22;
D is the known distance between first plate 21 and second plate 22.

The dielectric permittivity ε of the substance 1 is equal to $\varepsilon_0 \varepsilon_r$ and can be obtained by inverting the Eq. 1, by making explicit the product $\varepsilon_0 \varepsilon_r$.

Figure 6:
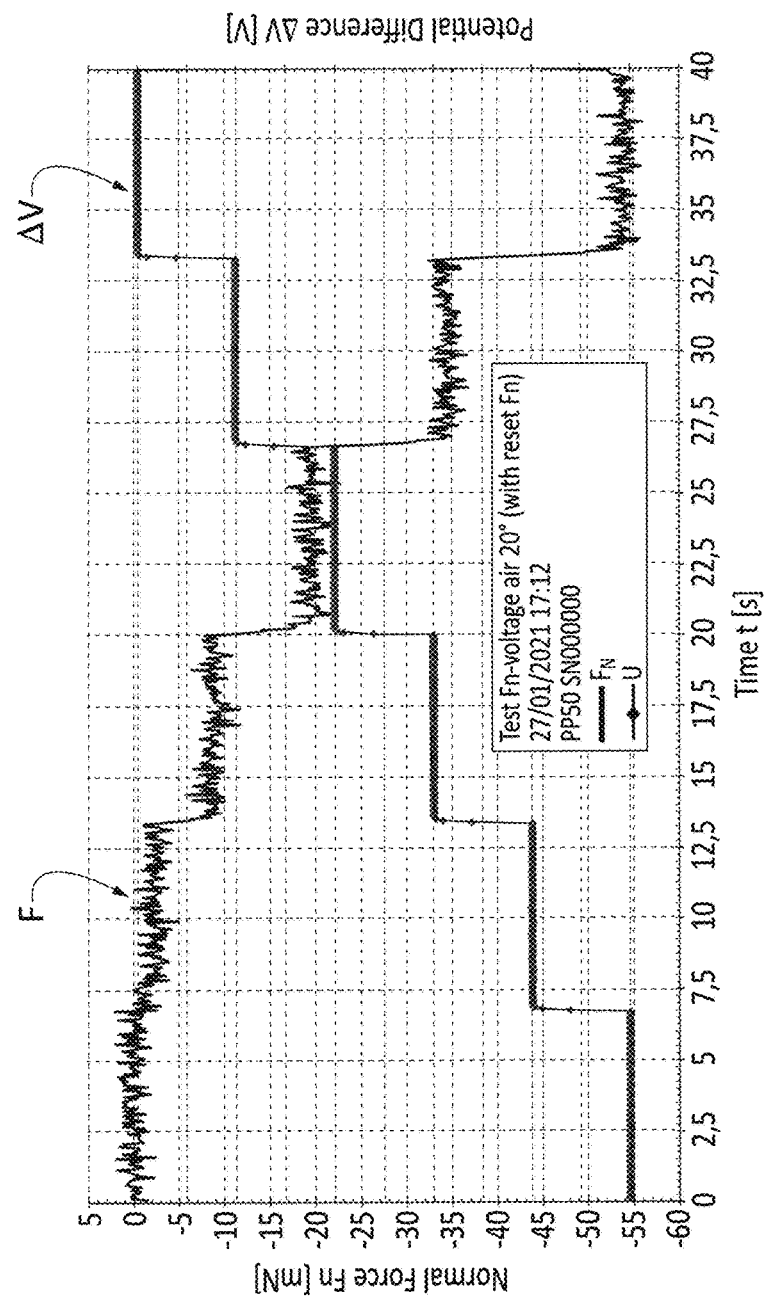
FIGS. 6-11 show the results of the measurement method according to the present invention by means of graphs.

FIG. 6 shows the results of a test performed according to the embodiment of FIG. 4, by using the aforementioned Anton Paar© MCR 302 ® rheometer and a FUG© HCP 14-12500 voltage generator. During the arranging step 104, the distance D between the first plate 21 and the second plate 22 is set equal to 1 mm ($10^{-3}$ m). The substance 1, whose electric permittivity ε is to be calculated, is constituted by air of which the relative dielectric constant $\varepsilon_r$ at 296.15 K (23° C.) equal to 1.00059 is known. The substance 1 analyzed is thus in the aeriform state. The measurement step 106 provides for capturing 800 samples at 0.05 s intervals, for a total duration of 40 s at a controlled temperature of 293.15 K (20° C.). The setting step 105 provides for imposing said potential difference ΔV by making a stepped voltage ramp, at intervals of 500 V each, between 0 V and 2.5 kV. Then, during the calculation step 107, the normal force F values captured for each level of potential difference ΔV are averaged, and in the converting step 108 the resulting averaged values are used in Eq. 1 to obtain the dielectric permittivity ε of the substance 1.

TABLE 1

| Potential difference ΔV [V] | $\varepsilon_r$ measured at 0 Hz (20° C.) | Deviation from known $\varepsilon_r$ (23° C.) |
|---|---|---|
| 500 | 1.00048 | −0.01% |
| 1000 | 1.00149 | 0.09% |
| 1500 | 0.99367 | −0.69% |
| 2000 | 0.99342 | −0.72% |
| 2500 | 0.98996 | −1.06% |

Table 1 shows the validation of the test performed, highlighting the percentage deviation between the known relative dielectric constant of the air at 296.15 K (23° C.) and the relative dielectric constant $\varepsilon_r$ obtained by the measurement method 100 at 293.15 K (20° C.) for each potential difference ΔV imposed. As is evident, the measurement method according to the present invention is particularly accurate.

Figure 7:
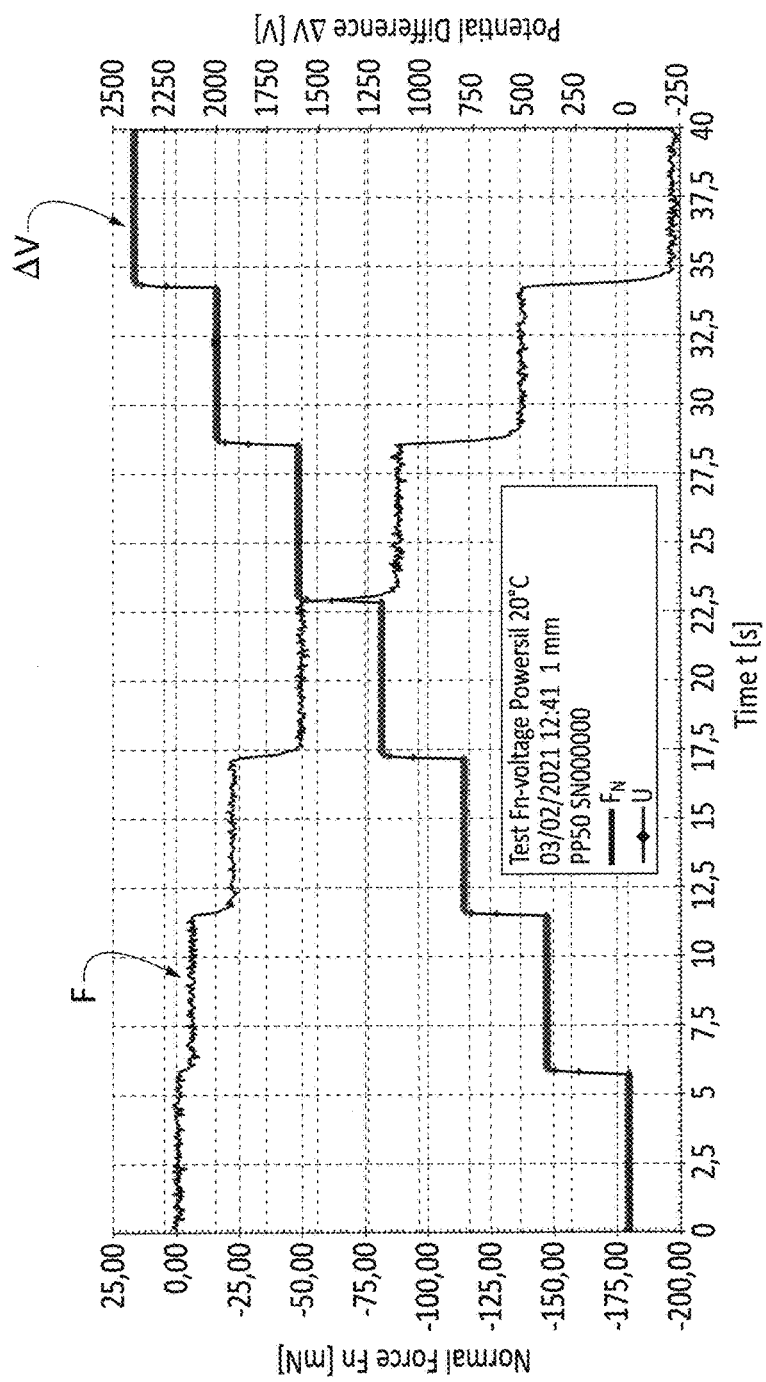

FIG. 7 shows the results of a second test performed by using the same measurement architecture as the previous example, but by using the POWERSIL® FLUID TR-50 manufactured by Wacker Chemie AG as substance 1, a commercial short-chain silicone oil based on polydimethylsiloxane mainly used as a cooling and insulation fluid in the transformers. The substance 1 analyzed is thus in the liquid state. For such substance 1 the manufacturer states a relative dielectric constant $\varepsilon_r$ at 50 Hz of 2.55±0.05. During the arranging step 104, the distance D between the first plate 21 and the second plate 22 is set equal to 0.8 mm ($8\times10^{-4}$ m). The measurement step 106 provides for capturing 800 samples at 0.05 s intervals, for a total duration of 40 s at a controlled temperature of 293.15 K (20° C.). The setting step 105 provides for imposing said potential difference ΔV by making a stepped voltage ramp, at intervals of 400 V each, between 0 V and 2.4 kV. Then, during the calculation step 107, the normal force F values captured for each level of potential difference ΔV are averaged and the resulting averaged values are used in Eq. 1 to obtain the electric permittivity ε, and consequently also the relative dielectric constant $\varepsilon_r$, of the substance 1.

TABLE 2

| Potential difference ΔV [V] | $\varepsilon_r$ measured at 0 Hz (20° C.) | Deviation from declared $\varepsilon_r$ (50 Hz) |
|---|---|---|
| 400 | 2.760 | 8.2% |
| 800 | 2.555 | 0.2% |
| 1200 | 2.546 | −0.2% |
| 1600 | 2.535 | −0.6% |
| 2000 | 2.529 | −0.8% |
| 2400 | 2.520 | −1.2% |

Table 2 shows the results of the test performed, highlighting the percentage deviation between the known relative dielectric constant $\varepsilon_r$ stated at 50 Hz and the relative dielectric constant $\varepsilon_r$ at 0 Hz obtained by the measuring method 100 for each potential difference ΔV imposed between the first plate 21 and the second plate 22. Note how, due to the resolution of the load cell (0.5 mN), the measurements are less reliable at low voltages, where the normal forces are smaller in absolute value than at higher potential differences.

According to embodiment of FIG. 5, during the arranging step 104, the second plate 22 is placed not in contact with said substance 1, thus leaving an air layer, or air cushion, having thickness D1 between said substance 1 and said second plate 22. As evident, there is no adhesion between the second plate 22 and the substance 1. In such embodiment, in the converting step 108 the electric permittivity ε of the substance 1 is obtained according to the equation:

$$F = \frac{1}{2}\varepsilon_0\varepsilon_{r1}\varepsilon_{r2}^2 S \frac{\Delta V^2}{(\varepsilon_{r2}D1 + \varepsilon_{r1}D2)^2} \quad \text{(Eq. 2)}$$

where:
$\varepsilon_0$ is the dielectric constant of vacuum equal to $8{,}9\cdot10^{-12}$ $C^2/(N\cdot m^2)$;
$\varepsilon_{r1}$ is the relative dielectric constant of air equal to 1.00059;
$\varepsilon_{r2}$ is the relative dielectric constant of the substance 1;
S is the surface area of said first plate 21 and second plate 22;
ΔV is the potential difference between said first plate 21 and second plate 22;
D1 is the thickness of said air layer;
D2 is the thickness of said substance 1, measured in a perpendicular direction to the extension of said first plate 21 and second plate 22.

In such embodiment, the distance D between the first plate 21 and second plate 22 is equal to D1+D2, while the dielectric permittivity ε is equal to $\varepsilon_0\varepsilon_{r1}$ and can be obtained by inverting and solving the second-degree equation of Eq. 2.

Note that the air layer is replaceable with layers of other aeriform elements or mixtures of aeriform elements whose relative dielectric constant is known $\varepsilon_{r1}$.

Figure 8:
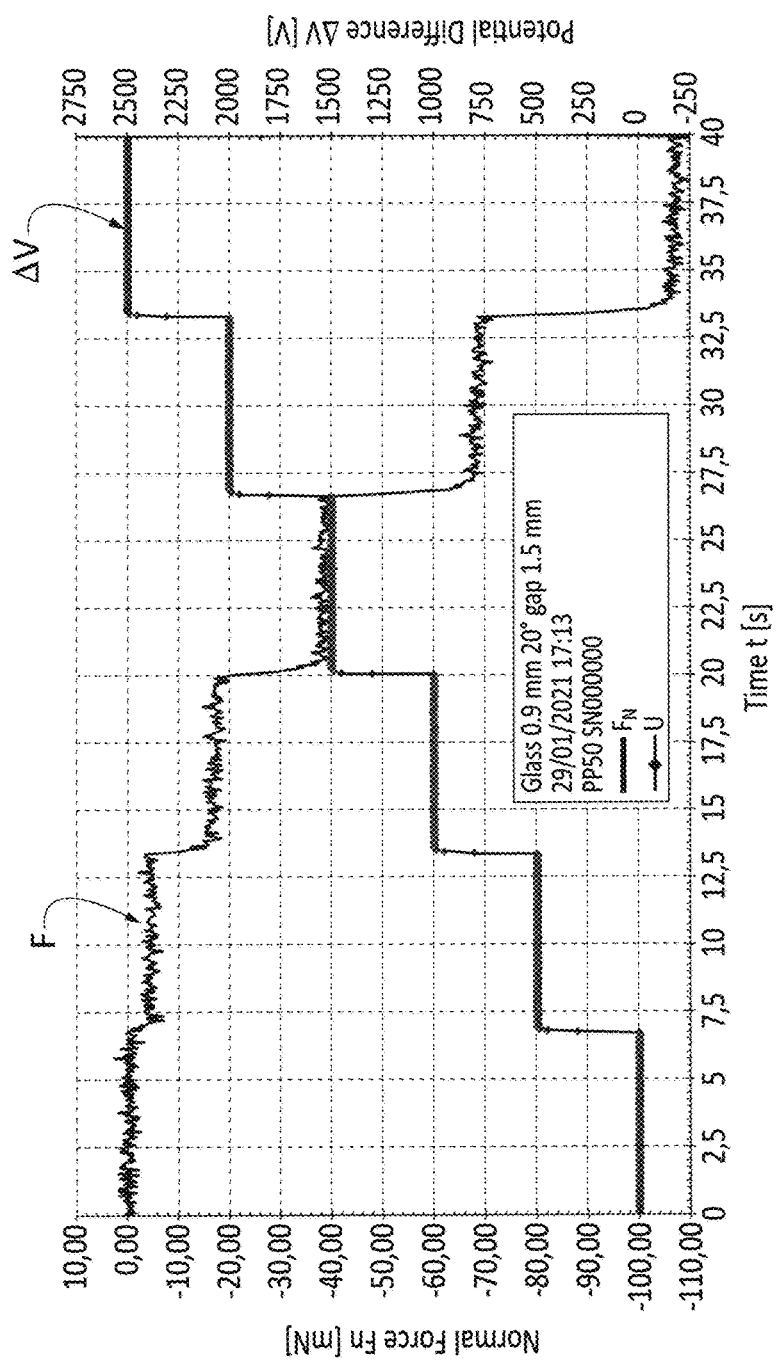

FIG. 8 shows the results of a test performed according to the embodiment of FIG. 5, still by using the aforementioned Anton Paar© MCR 302 ® rheometer and a FUG© HCP 14-12500 voltage generator. Such test is for a solid state substance 1, specifically an optical grade glass disc having a diameter of 50 mm ($5\times10^{-2}$ m) and an average thickness D2 of 0.92 mm ($9.2\times10^{-4}$ m). About the substance 1 we know the relative dielectric constant $\varepsilon_r$ stated by the manufacturer to be equal to 6.79 at 100 Hz.

During the arranging step 104, the distance D between the first plate 21 and second plate 22 is set equal to 1.5 mm ($1.5\times10^{-3}$ m), thus leaving an air layer having a thickness D2 equal to 0.58 mm ($5.8\times10^{-4}$ m) between the second plate 22 and the substance 1. The measurement step 106 provides for capturing 800 samples at 0.05 s intervals at a controlled temperature of 293.15 K (20° C.), for a total duration of 40 s. The setting step 105 provides for imposing said potential difference ΔV by making a stepped voltage ramp, at intervals of 500 V each, between 0 V and 2.5 kV. Then, during the calculation step 107, the normal force F values captured for each level of potential difference ΔV are averaged, and in the converting step 108 the resulting averaged values are used in Eq. 2 to obtain the dielectric permittivity ε of the substance 1.

TABLE 3

| Potential difference ΔV [V] | $\varepsilon_r$ measured at 0 Hz (20° C.) | Deviation from declared $\varepsilon_r$ (100 Hz) |
|---|---|---|
| 500 | 6.7312 | −0.9% |
| 1000 | 6.7879 | 0.0% |
| 1500 | 6.8208 | 0.5% |
| 2000 | 6.8949 | 1.5% |
| 2500 | 6.7112 | −1.2% |

Table 3 shows the results of the test performed, highlighting the percentage deviation between the known relative dielectric constant $\varepsilon_r$ stated at 100 Hz and the relative dielectric constant $\varepsilon_r$ at 0 Hz obtained by the measuring method 100 for each potential difference ΔV imposed between the first plate 21 and the second plate 22.

According to an embodiment, the measurement method 100 comprises a step 109 of extracting the polarization curve CP of the substance 1, also called hysteresis curve CP. Said embodiment of the measurement method 100 is particularly suitable for the substances exhibiting ferroelectric behavior and requires that the potential difference ΔV between the first plate 21 and the second plate 22 be varied by performing a complete cycle in the range [ΔVmin, ΔVmax] of potential differences ΔV that can be imposed by the voltage generator 3. Specifically, during the measurement step 106, the potential difference ΔV is varied cyclically from an initial zero potential difference until reaching a potential difference lower than or equal to the maximum potential difference ΔVmax. Subsequently, the potential difference ΔV between the plates is raised to a value greater than or equal to the minimum difference ΔVmin, and then the measurement is ended by returning to a zero value of potential difference ΔV. Said cycle can be performed one or more times.

In particular, the step of extracting 109 the polarization curve CP provides for calculating a polarization parameter P. Said polarization parameter P is calculated according to the following relation:

$$P = \varepsilon_0\left(\frac{\varepsilon}{\varepsilon_0} - 1\right)E \tag{Eq. 3}$$

where:
- $\varepsilon_0$ is the dielectric constant of vacuum equal to $8{,}9 \cdot 10^{-12}$ C²/(N·m²);
- $\varepsilon$ is the electric permittivity of the substance 1 calculated during the converting step 108;
- E is an electric field imposed between said first plate 21 and second plate 22, obtained as a function of the potential difference ΔV.

Specifically, the parameter ($\varepsilon/\varepsilon_0 - 1$) is called electrical susceptibility and is typically denoted by the symbol $\chi$.

Figure 9:
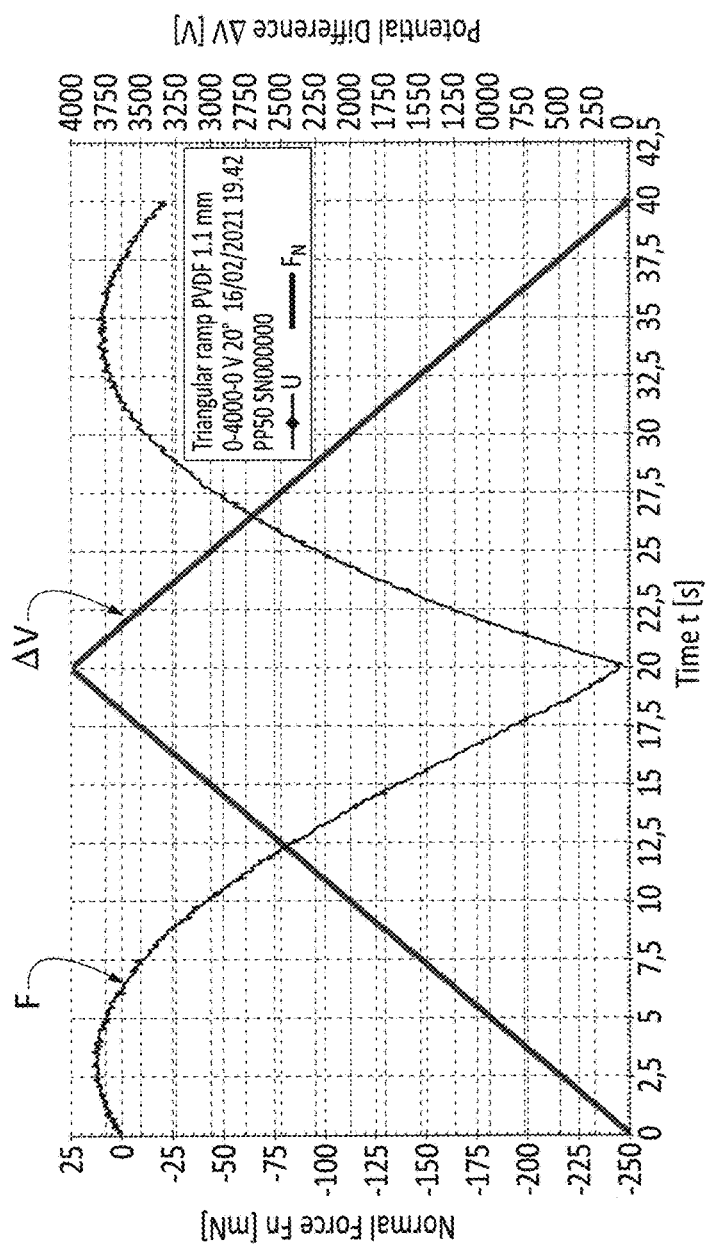

FIGS. 9 e 10 show the results of a test to evaluate the polarization curve CP of a ferroelectric substance 1, by using the same measurement system adopted for the previous tests (Anton Paar Rheometer© MCR 302 @ and FUG voltage Generator© HCP 14-12500). The test was carried out on a solid-state substance 1, specifically a commercial polyvinylidene fluoride (PVDF) disc (SOLEF® 6010, manufactured by Solvay©) having an average thickness D2 of 1.02 mm (1.02×10⁻³ m) maintained at a constant temperature of 293.15 K (20° C.). During the arranging step 104, the distance D between the first plate 21 and second plate 22 is set equal to 1.5 mm (1.5×10⁻³ m), thus leaving an air layer having a thickness D2 equal to 0.48 mm (4.8×10⁻⁴ m) between the second plate 22 and the substance 1. The measurement step 106 provides for capturing 800 samples at 0.05 s intervals, for a total duration of 40 s. The setting step 105 provides for imposing said potential difference ΔV by making a triangular voltage wave. As shown in FIG. 9, the potential difference ΔV increases linearly from 0 V to 4 kV and then returns to 0 V. It should be noted that for this test no calculation step 107 of an average value is performed, and for each level of potential difference ΔV a converting step 108 is performed by Eq. 2 to obtain the dielectric permittivity ε of the substance 1. Note how at the end of the test, i.e., when the potential difference ΔV returns to 0 V at 40 s, a non-zero normal force F is detected on the second plate 22, indicative of residual polarization of the substance 1 even in the absence of an imposed electric field E.

Figure 10:
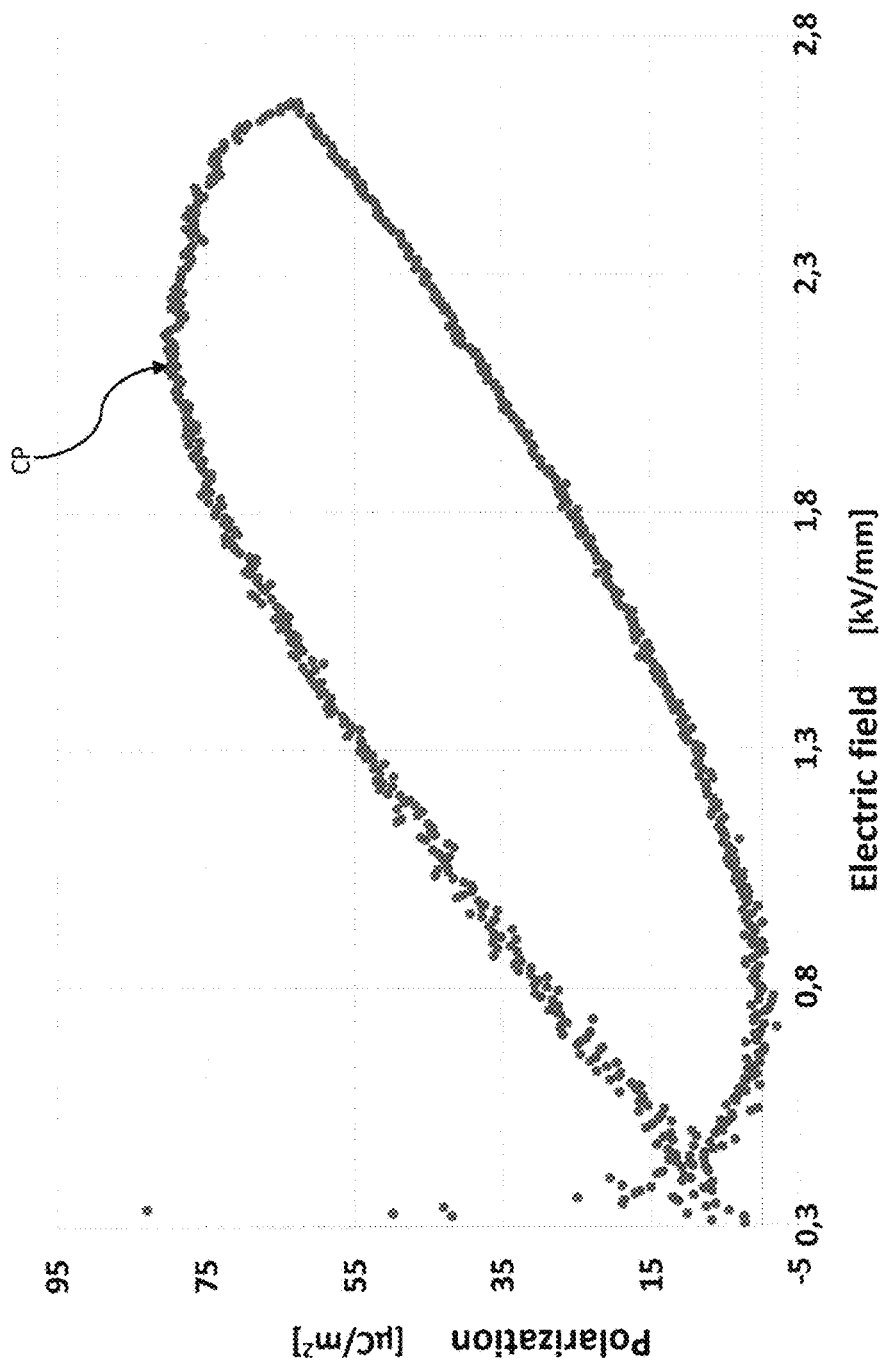

Once the dielectric permittivity ε and the electric field E imposed between the first plate 21 and the second plate 22 are known, by Eq. 3 it is possible to obtain the polarization parameter P at each instant of the test performed and draw the polarization curve CP of FIG. 10, where the polarization parameter P is related to the imposed electric field E. Since the FUG© HCP 14-12500 voltage generator is a unipolar generator, it was not possible to follow the entire hysteresis cycle of the material by analyzing negative potential differences ΔV. In other embodiments, by using a voltage generator 3 capable of reversing the polarity of the potential difference ΔV applied, the entire polarization curve CP of substance 1 can be obtained.

Preferably, the voltage generator 3 is a voltage generator with current feedback control, also called voltage generator with current feedback. Such type of voltage generator 3 is configured to detect a current I flowing in said substance 1 during said measurement step 108. According to such aspect, the measurement method 100 comprises a step of deriving 110 an electrical conductivity parameter σ of the substance 1 according to the following relation:

$$\sigma = \frac{ID}{S\Delta V} \tag{Eq. 4}$$

where:
- σ is the electrical conductivity of the substance 1;
- I is a current flowing in the substance 1 detected by the voltage generator 3;
- D is the distance between said first plate 21 and second plate 22;
- S is the surface area of said first plate 21 and second plate 22;
- ΔV is the potential difference between said first plate 21 and second plate 22.

Figure 11:
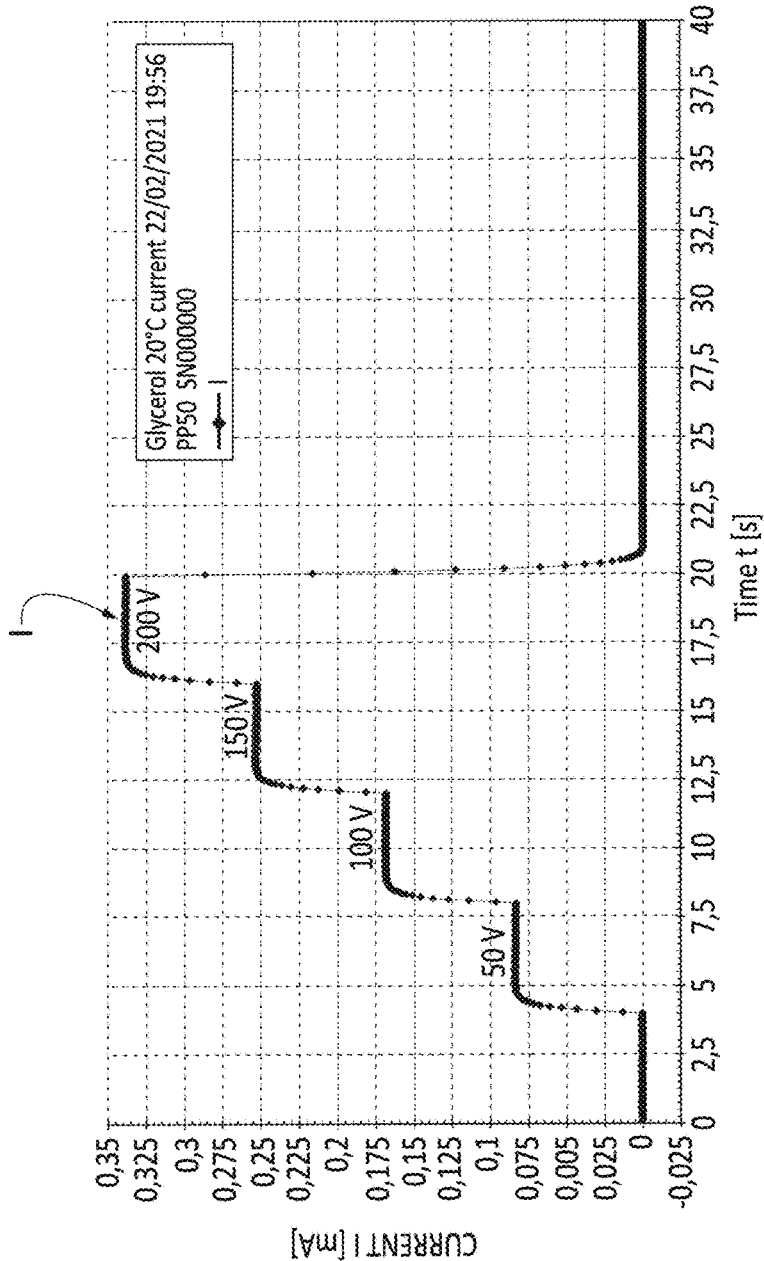

Note that in order to carry out the derivation step 110 of the electrical conductivity parameter σ, the contact between the substance 1 and the second plate 22 is necessary. FIG. 11 shows the current detected during a test performed by using the measurement architecture (Anton Paar© MCR 302 ® rheometer and FUG© HCP 14-12500 voltage generator) of the previously described tests on a liquid sample of commercial glycerol maintained at a controlled temperature of 293.15 K (20° C.). Note that the FUG© HCP 14-12500 voltage generator has a current feedback loop with a saturation level equal to 1 mA. During the arranging step 104, the distance D between the first plate 21 and the second plate 22 is set equal to 1.3 mm (1.3×10⁻³ m). The setting step 105 provides for imposing said potential difference ΔV by making a stepped voltage ramp, at intervals of 50 V each, between 0 V and 200 V. For each imposed value of potential difference ΔV, the current I flowing inside the substance 1 is detected by the feedback loop. Finally, during the derivation step 110, the electrical conductivity parameter σ of the substance 1 is obtained according to Eq. 4.

Table 4 shows the results of the test just described, relating the potential difference ΔV, the detected current I and the derived electrical conductivity a. Note how the detected current I increases linearly with the imposed potential difference ΔV, while the electrical conductivity a derived as the potential difference ΔV changes remains substantially constant.

TABLE 4

| Potential difference ΔV [V] | Measured current (mA) | Derived electrical conductivity σ [S/m] |
|---|---|---|
| 50 | 0.084 | 1.1123E−06 |
| 100 | 0.168 | 1.1123E−06 |
| 150 | 0.253 | 1.11672E−06 |
| 200 | 0.338 | 1.11892E−06 |

Note how the measurement method 100 and the measurement system M shown in the present description are particularly versatile. In fact, by means of an architecture designed for measurements of other kinds such as the rheometry, the measurement method 100 and the measurement system M allow particularly reliable and fast measurements of the electrical characteristics of the substance 1 at 0 Hz, regardless of its state of aggregation. Furthermore, from the present description it appears that the measurement method 100 and the measurement system M are not limited only to the measurement of the electric permittivity ε of the substance 1, but also allow the determination of the polarization and conductivity characteristics of the substance itself by using instrumentation known for other purposes.

Figure 12:
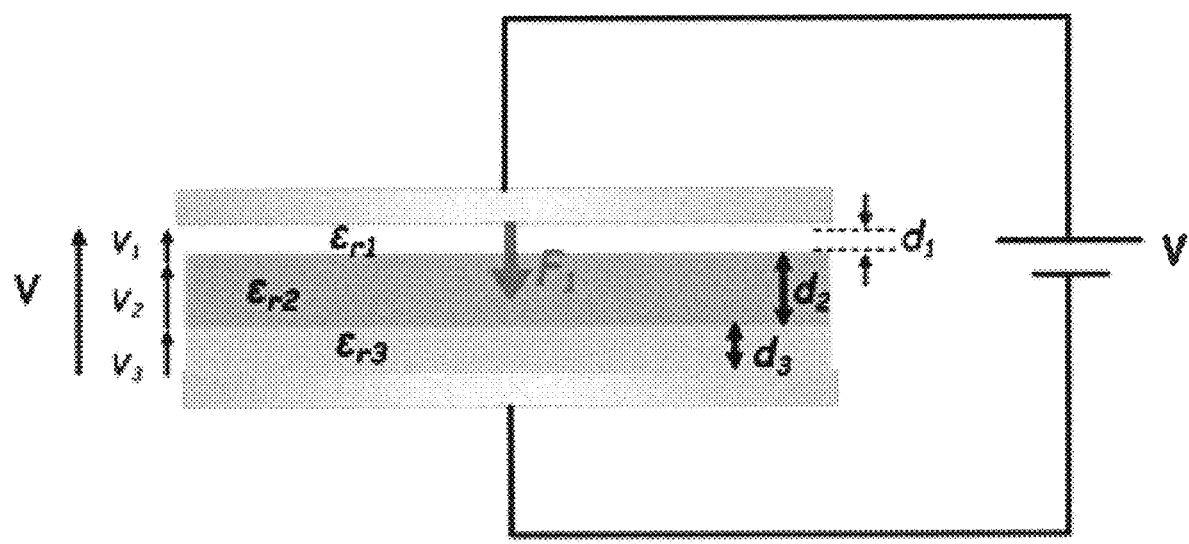
FIG. 12 depicts a further embodiment of the measurement system of the present invention according to a simplified view.

FIG. 12 depicts, according to a simplified view, a further embodiment of the measurement system of the present invention.

The measurement method, already described in the previous description, can be extended to the more general case of a system constituted by 3 dielectrics. In the present case, the measurement system is constituted by 3 dielectrics stacked (in series) between the two plates of the rheometer, with dielectric constants $\varepsilon_{r1}$, $\varepsilon_{r2}$ and $\varepsilon_{r3}$ and thicknesses $d_1$, $d_2$ e $d_3$, respectively, as depicted in FIG. 12.

In the present model, called ΔV the potential difference applied between the top plate (energized) and the bottom plate (at ground potential), the force F acting on the top plate, in contact with the dielectric having a permittivity $\varepsilon_{r1}$, can be estimated algebraically when the edge effects can be neglected (i.e., if the sum of the three thicknesses is lower than at least ¹/₁₀ of the diameter of the top plate), by using the equation:

$$F_1 = \frac{1}{2}\varepsilon_0\varepsilon_{r1}S\frac{(\varepsilon_{r2}\varepsilon_{r3}\Delta V)^2}{(\varepsilon_{r2}\varepsilon_{r3}d_1 + \varepsilon_{r1}\varepsilon_{r3}d_2 + \varepsilon_{r1}\varepsilon_{r2}d_3)^2} \quad \text{(Eq. 5)}$$

wherein S represents the surface area of the upper electrode (on which the force measurement is made) and $\varepsilon_0$ is the dielectric constant of the vacuum equal to $8,9 \cdot 10^{-12}$ C²/(N·m²)

The model with three dielectrics can be useful in improving the accuracy of measurements on both solid and liquid samples.

In fact, in the model with two dielectrics previously described, the measurement may be affected by an error resulting from the fact that even under conditions of perfect flatness of the discoidal sample whose dielectric constant is to be measured, there is always a layer of air (however infinitesimal) between the lower plate 21 and the sample itself, the thickness of which is difficult to estimate.

The proposed solution to overcome this problem is to suspend the disc of solid sample to be measured between the two plates of the rheometer by using a specially developed adjustable holder, so as to leave an air layer of controlled thickness both above and below the sample (or better between the sample and the two plates).

Figure 13:
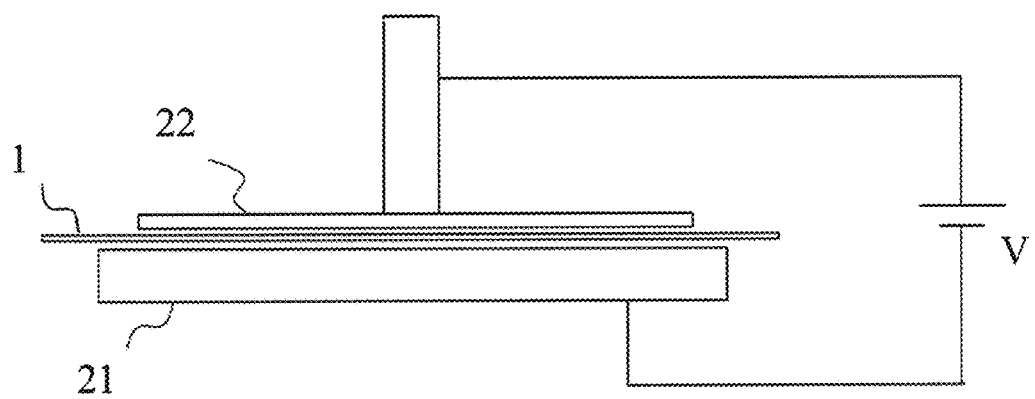
FIG. 13 depicts a further view of the embodiment of the measurement system of FIG. 12.

The proposed configuration is depicted in FIG. 13 in which the sample 1 to be measured, the lower plate 21 at ground and the upper plate 22 energized can be seen.

Under the assumption that the two layers of air have the same thickness $d_1$, the above equation can be simplified by considering that the dielectrics of the layers contacting the electrodes also have the same dielectric constant $\varepsilon_{r1}$.

Under these conditions the previous equation can be rewritten as:

$$F = \frac{1}{2}\varepsilon_0\varepsilon_{r1}S\frac{(\varepsilon_{r2}\Delta V)^2}{(\varepsilon_{r1}d_2 + 2\varepsilon_{r2}d_1)^2} \quad \text{(Eq. 6)}$$

wherein once the thicknesses of the sample and the two air layers are known and the surface of the upper electrode S is known, the unknown dielectric constant of the solid sample can be easily obtained. In addition to the perfect control of the layers of air between the sample and the two plates of the rheometer, the measurement method also allows to obviate the well-known problem of polarization of the electrodes themselves. The configuration with 3 dielectrics can also be used to measure liquid samples (for which the system with both one and two dielectrics, in which a layer of air is left between the free liquid surface and the top plate, has been previously proposed), if a material of known dielectric constant is used in the layer with dielectric constant $\varepsilon_{r2}$. In such a case, by confining the liquid of unknown dielectric constant below the solid sample (i.e., in a position corresponding to the dielectric with relative permittivity $\varepsilon_{r3}$), it is possible to eliminate both the possible effects of hydrodynamic instability (the more likely the higher the electric field) and possible edge effects arising from the surface tension of the liquid being measured.

Thus, in general, in the measurement method of the invention, during the step of arranging said second plate (22) at a distance (D) from said first plate (21), in said converting step (108), said electric permittivity (ε) of the substance (1) is obtained by using the equation:

$$F_1 = \frac{1}{2}\varepsilon_0\varepsilon_{r1}S\frac{(\varepsilon_{r2}\varepsilon_{r3}\Delta V)^2}{(\varepsilon_{r2}\varepsilon_{r3}d_1 + \varepsilon_{r1}\varepsilon_{r3}d_2 + \varepsilon_{r1}\varepsilon_{r2}d_3)^2} \quad \text{(Eq. 5)}$$

where:
$\varepsilon_0$ is the dielectric constant of vacuum equal to $8,9 \cdot 10^{-12}$ C²/(N·m²);
$\varepsilon_{r1}$ is the dielectric constant relating to the material in contact with the second movable plate (22);
$\varepsilon_{r2}$ is the relative dielectric constant of the substance in the intermediate layer;
$\varepsilon_{r3}$ is the dielectric constant relating to the dielectric material in contact with the first fixed plate (21);
S is the area of the surface of said second plate (22);
ΔV is the potential difference (V) between said first plate (21) and second plate (22);
d1 is a thickness of said dielectric material in contact with the second movable plate (22);
d2 is a thickness of the material in the intermediate layer;
d3 is a thickness of the dielectric material in contact with the first fixed plate (21);
said distance (D) being equal to d1+d2+d3, and
said dielectric permittivity (ε) being equal to $\varepsilon_0\varepsilon_{r2}$ in case the second plate (22) is placed not in contact with said substance (1), thus leaving a layer comprised of a first dielectric material between said substance (1) and the second plate (22) and the first plate (21) is placed not in contact with said substance (1), thus leaving a layer comprised of a second dielectric material between said substance (1) and said first plate (21), or else
said dielectric permittivity (ε) being equal to $\varepsilon_0\varepsilon_{r1}$ in case the second plate (22) is placed in contact with said substance (1) and the first plate (21) is placed not in contact with said substance (1), thus leaving two layers comprised of a first and a second dielectric material between said substance (1) and said first plate (21), or else
said dielectric permittivity (E) being equal to $\varepsilon_0\varepsilon_{r3}$ in case the first plate (21) is placed in contact with said substance (1) and the second plate (22) is placed not in contact with said substance (1), thus leaving two layers comprised of a first and a second dielectric material between said substance (1) and said second plate (22).

In general, the material having unknown permittivity (object of the measurement) can be placed in any of the 3 layers, as long as the dielectric constants of the other two (and, of course, all the thicknesses) are known.

In the case of a liquid sample, for example, the liquid can be inserted either in a first position in contact with the second movable plate 22 integral with the force sensor, or in a third position, that is, in contact with the first plate 21.

The effects of hydrodynamic instability would be suppressed in both cases, while the effect of the surface tension of the liquid would still be present if the liquid were in the position corresponding to the layer having the dielectric constant $\varepsilon_{r1}$.

In the case where the configuration is used for a solid sample, the substance to be measured would be in a second position (i.e., in the center), while in the case of a liquid sample it would preferably be in the third position (so the unknown would be $\varepsilon_{r3}$) or even in the first position (and the unknown would be $\varepsilon_{r1}$).

Example I—Validation of Model with 3 Dielectrics in Series—Equation (5)

Figure 14:
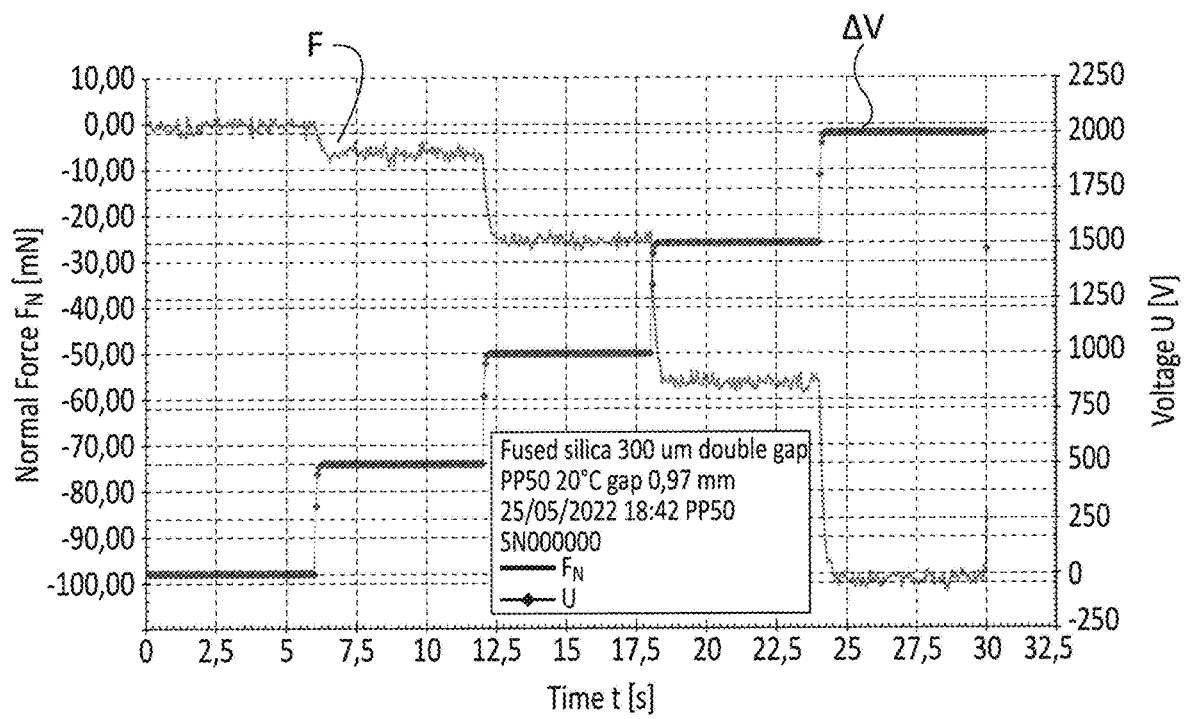
FIG. 14 depicts a graph of the axial force measurement as a function of the voltage applied to a sample measured according to a model with three dielectrics in series, two of which (layers 1 and 3) are constituted by a layer of air having different thickness $d_1$ equal to 150 μm and $d_3$ equal to 300 μm.

The model with three dielectrics in series, two of which (layers 1 and 3) are constituted by a layer of air of different thicknesses $d_1$ equal to 150 μm and $d_3$ equal to 300 μm (measured by two triangulation laser sensors made by Keyence) was validated by measuring the dielectric constant of a solid sample constituted by a fused silica sample made by MicroChemicals GmbH (expected dielectric constant between 3.6 and 3.9), laser cut in the form of a disc having diameter of 62 mm and thickness equal to 520±2 μm. The measurement was performed by using an Anton Paar MCR 302 rotational rheometer equipped with an electrorheology module available from the SNN-Lab at Sapienza, comprising a DC voltage generator, brand name FUG, model HCP 14-12500. The measurement provides for applying a voltage between the top plate and the bottom plate (grounded), by making a stepped voltage ramp (FIG. 14) increasing over time at intervals of 500 V each, between 0 V and 2 kV, and measuring the corresponding force detected on the top plate.

TABLE 5

| Voltage [V] | Axial force measured on top plate [mN] | Expected force according to model Eq. 5 | Deviation from model by using a dielectric constant of 3.9 |
|---|---|---|---|
| 500 | 6.32 | 6.39 | −1.06% |
| 1000 | 25.45 | 25.55 | −0.40% |
| 1500 | 56.56 | 57.50 | −1.62% |
| 2000 | 99.40 | 102.21 | −2.75% |

Table 5 shows the results of the test performed, highlighting the percentage deviation between the expected axial force according to the model relative to equation 5 (for a relative dielectric constant of 3.9) and the corresponding force obtained by the measurement method 100 for each potential difference ΔV imposed between the first plate 21 and the second plate 22.

Example II—Validation of Model (Eq. 6)

The model with three dielectrics in series, two of which (layers 1 and 3) constituted by a layer of air of the same thickness $d_1$, was validated by measuring the dielectric constant of a solid sample of fused silica made by MicroChemicals GmbH (expected dielectric constant between 3.6 and 3.9), laser cut in the form of a disc having diameter of 62 mm and thickness of 520±2 μm. The measurement was performed by using an Anton Paar MCR 302 rotational rheometer equipped with an electrorheology module available from the SNN-Lab at Sapienza, comprising a DC voltage generator, brand name FUG, model HCP 14-12500. The measurement provides for applying a voltage between the top plate and the bottom plate (grounded), by making a stepped voltage ramp (FIG. 15) increasing over time at intervals of 500 V each, between 0 V and 2 kV, and measuring the corresponding force detected on the top plate.

Figure 15:
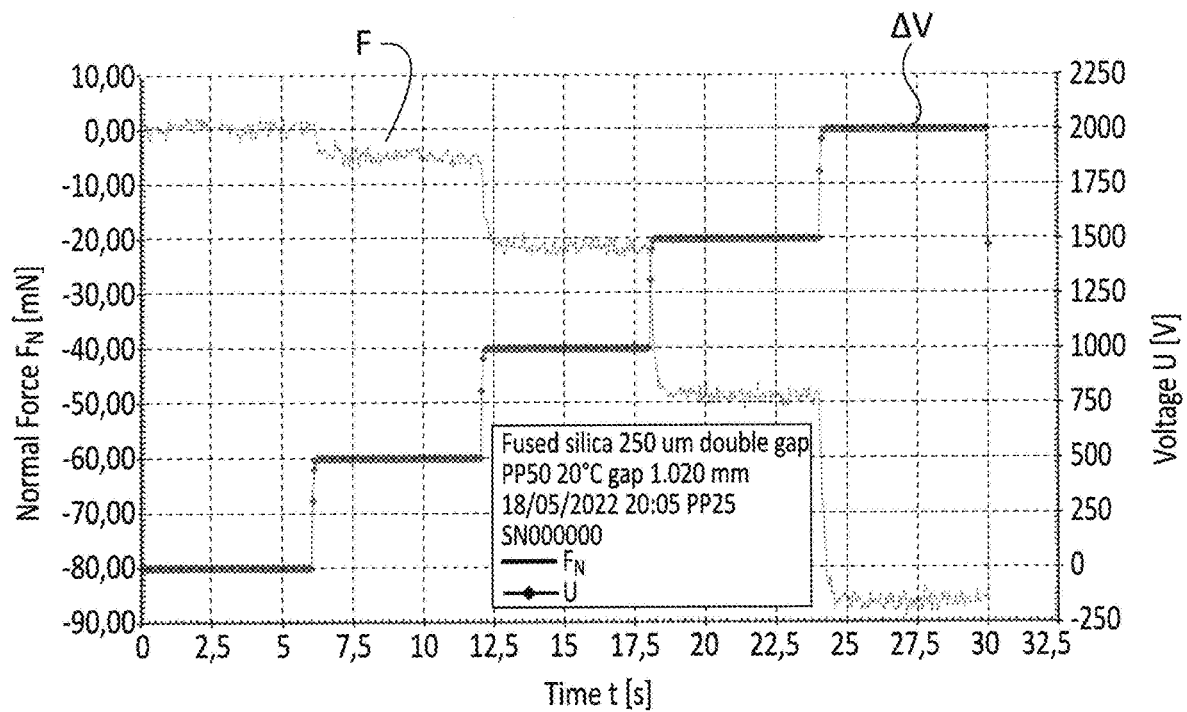
FIG. 15 depicts a graph of the axial force measurement as a function of voltage applied to a sample measured according to a model with three dielectrics in series, two of which (layers 1 and 3) are constituted by a layer of air having the same thickness $d_1$.

In particular, FIG. 15 depicts a graph of the axial force measurement as a function of the applied voltage, performed at 20° C. on silica glass disc equidistant from the two electrodes, setting the distance between the plates to be 1.02 mm and a distance between sample and electrodes to be 250 μm on both sides.

TABLE 6

| Voltage [V] | Axial force measured on top plate [mN] | Expected force according to model Eq. 6 | Deviation from model by using a dielectric constant of 3.9 |
|---|---|---|---|
| 500 | 4.892 | 5.4197 | −9.73% |
| 1000 | 21.528 | 21.6786 | −0.69% |
| 1500 | 48.710 | 48.777 | −0.14% |
| 2000 | 86.250 | 86.7146 | −0.54% |

Table 6 shows the results of the test performed, highlighting the percentage deviation between the expected axial force according to the model relative to equation 6 (for a relative dielectric constant equal to 3.9) and the corresponding force obtained by the measurement method 100 for each potential difference ΔV imposed between the first plate 21 and the second plate 22

As stated above, the presence of the temperature control module 4,25 allows to investigate the dependency of the electric permittivity ε of the substance 1 as a function of the set temperature and, possibly, to determine the Curie temperature of the substance 1 itself.

In fact, as it is known, the ferroelectric Curie temperature is the temperature at which the transition between the ferroelectric and paraelectric phases takes place.

With the system and method of the invention, for materials undergoing the phase transition within the temperature range covered by the thermal control system, the Curie temperature of the relevant material can be identified.

For example, with the system of the invention, it is possible to identify the Curie temperature of barium titanate, which is around 120° C.

Modifications or improvements that are dictated by contingent or particular reasons, without thereby departing from the scope of the invention, may be made to the invention as described herein.

The invention claimed is:

1. A measurement method (100) of electric permittivity (ε) at 0 Hz of a substance (1), irrespective of its aggregation state, comprising the steps of:
pre-arranging (101) a rheometer (2) comprising an electrorheology module (20), said electrorheology module (20) being provided with a first plate (21) and a second plate (22) parallel each other, said first plate (21) being fixed and said second plate (22) being movable, said rheometer (2) further comprising a force sensor (23) operatively connected to said second plate (22) and configured to measure a normal force (F) to which said second plate (22) is subjected;

connecting (102) a voltage generator (3) to said rheometer (2), said voltage generator (3) being configured to impose a potential difference (ΔV) at 0 Hz between said first plate (21) and said second plate (22) in a range between a minimum potential difference (ΔVmin) and a maximum potential difference (ΔVmax);

placing (103) the substance (1) between said first plate (21) and said second plate (22);

arranging (104) said second plate (22) at a known distance (D) from said first plate (21);

imposing (105), by means of said voltage generator (3), said potential difference (ΔV) at 0 Hz between said first plate (21) and said second plate (22);

measuring (106), by means of said force sensor (23), the normal force (F) to which said second plate (22) is subjected; and converting (108) said normal force (F) to obtain said electric permittivity (ε) of the substance (1).

2. The measurement method (100) according to claim 1, wherein, during the step of arranging (104) said second plate (22) at a distance (D) from said first plate (21), the second plate (22) is placed in contact with the substance (1);

and wherein, in said converting step (108), said electric permittivity (ε) of the substance (1) is obtained according to the equation:

$$F = \frac{1}{2}\varepsilon_0\varepsilon_r S \frac{\Delta V^2}{D^2} \qquad \text{(Eq. 1)}$$

where:
F is the normal force (F) measured by the force sensor (23);
$\varepsilon_0$ is the dielectric constant of vacuum equal to 8,9·10$^{-12}$ C$^2$/(N·m$^2$);
$\varepsilon_r$ is a parameter of relative dielectric constant of the substance (1);
S is the area of the surface of said second plate (22);
ΔV is the potential difference (ΔV) between said first plate (21) and second plate (22);
D is the distance (D) between first plate (21) and second plate (22);
said electric permittivity (ε) being equal to $\varepsilon_0\varepsilon_r$.

3. The measurement method (100) according to claim 1, wherein, during the step of arranging said second plate (22) at a distance (D) from said first plate (21), the second plate (22) is not placed in contact with said substance (1), thus leaving an air layer between said substance (1) and said second plate (22);

and wherein, in said converting step (108), said electric permittivity (ε) of the substance (1) is obtained by using the equation:

$$F = \frac{1}{2}\varepsilon_0\varepsilon_{r1}\varepsilon_{r2}^2 S \frac{\Delta V^2}{(\varepsilon_{r2}D1 + \varepsilon_{r1}D2)^2} \qquad \text{(Eq. 2)}$$

where:
$\varepsilon_0$ is the dielectric constant of vacuum equal to 8,9·10$^{-12}$ C$^2$/(N·m$^2$);
$\varepsilon_{r1}$ is the relative dielectric constant of air equal to 1.000589;
$\varepsilon_{r2}$ is a parameter of relative dielectric constant of the substance (1);
S is the area of the surface of said second plate (22);
ΔV is the potential difference (V) between said first plate (21) and second plate (22);
D1 is a thickness of said air layer;
D2 is the thickness of said substance, measured in a perpendicular direction to an extension of said first plate (21) and second plate (22);
said distance (D) being equal to D1+D2 and said electric permittivity (E) being equal to $\varepsilon_0\varepsilon_{r1}$.

4. The measurement method (100) according to claim 1, wherein said measuring step (106) comprises performing repeated measurements for capturing a plurality of samples of said normal force (F).

5. The measurement method (100) according to claim 4, further comprising a step of calculating (107) a mean value of at least part of said plurality of samples, said mean value being representative of said normal force (F) converted during said converting step (108).

6. The measurement method (100) according to claim 4, wherein said measuring step (106) comprises varying said potential difference (ΔV) while performing said repeated measurements.

7. The measurement method (100) according to claim 6, further comprising a step of extracting (109) a polarization curve (CP) of the substance (1).

8. The measurement method (100) according to claim 7, wherein said step of extracting (109) said polarization curve (CP) of the substance (1) comprises calculating a polarization parameter (P) according to the following relation:

$$P = \varepsilon_0\left(\frac{\varepsilon}{\varepsilon_0} - 1\right)E \qquad \text{(Eq. 3)}$$

where:
$\varepsilon_0$ is the dielectric constant of vacuum equal to 8,9·10$^{-12}$ C$^2$/(N·m$^2$);
ε is the electric permittivity of the substance (1) calculated during the converting step (108);
E is the electric field intensity imposed between said first plate (21) and second plate (22).

9. The measurement method (100) according to claim 1, wherein said voltage generator (3) is a voltage generator with feedback current control configured to detect a current (I) flowing in said substance (1) during said measuring step (106); said measurement method (100) comprising step of deriving (110) a parameter of electrical conductivity (σ) of the substance (1) according to the following relation:

$$\sigma = \frac{ID}{S\Delta V} \qquad \text{(Eq. 4)}$$

where:
σ is the electrical conductivity of the substance (1);
I is a current flowing in the substance (1) detected by the voltage generator (3);
D is the distance between said first plate (21) and second plate (22);
S is the area of the surface of said second plate (22);
ΔV is the potential difference between said first plate (21) and second plate (22).

10. The measurement method (100) according to claim 1, wherein said rheometer (2) is equipped with a temperature control module (4, 25) configured to maintain said electrorheology module (20) and said substance (1) at a desired temperature during the measuring step (106).

11. The measurement method (100) according to claim 10, wherein said temperature control module comprises an element selected from a Peltier cell (25), a resistance system or an induction system, said element being operatively connected to said first plate (21), and a thermostat (4) for the temperature control of said element.

12. The measurement method (100) according to claim 1, wherein said force sensor (23) is a load cell.

13. The measurement method (100) according to claim 1, wherein, during the step of arranging said second plate (22) at a distance (D) from said first plate (21), in said converting step (108), said electric permittivity ($\varepsilon$) of the substance (1) is obtained by using the equation:

$$F_1 = \frac{1}{2}\varepsilon_0\varepsilon_{r1}S\frac{(\varepsilon_{r2}\varepsilon_{r3}\Delta V)^2}{(\varepsilon_{r2}\varepsilon_{r3}d_1 + \varepsilon_{r1}\varepsilon_{r3}d_2 + \varepsilon_{r1}\varepsilon_{r2}d_3)^2} \quad \text{(Eq. 5)}$$

where:
$\varepsilon_{r1}$ is the dielectric constant of the material in contact with the second movable plate (22);
$\varepsilon_{r2}$ is the relative dielectric constant of the substance in the intermediate layer;
$\varepsilon_{r3}$ is the dielectric constant relating to the dielectric material in contact with the first fixed plate (21);
S is the area of the surface of said second plate (22);
$\Delta V$ is the potential difference (V) between said first plate (21) and second plate (22);
d1 is a thickness of said dielectric material in contact with the second movable plate (22);
d2 is a thickness of the material in the intermediate layer;
d3 is a thickness of the dielectric material in contact with the first fixed plate (21);
said distance (D) being equal to d1+d2+d3, and
said dielectric permittivity ($\varepsilon$) being equal to $\varepsilon_0\varepsilon_{r2}$ in case the second plate (22) is placed not in contact with said substance (1), thus leaving a layer comprised of a first dielectric material between said substance (1) and the second plate (22) and the first plate (21) is placed not in contact with said substance (1), thus leaving a layer comprised of a second dielectric material between said substance (1) and said first plate (21), or else
said dielectric permittivity ($\varepsilon$) being equal to $\varepsilon_0\varepsilon_{r1}$ in case the second plate (22) is placed in contact with said substance (1) and the first plate (21) is placed not in contact with said substance (1), thus leaving two layers comprised of a first and a second dielectric material between said substance (1) and said first plate (21), or else
said dielectric permittivity ($\varepsilon$) being equal to $\varepsilon_0\varepsilon_{r3}$ in case the first plate (21) is placed in contact with said substance (1) and the second plate (22) is placed not in contact with said substance (1), thus leaving two layers comprised of a first and a second dielectric material between said substance (1) and said second plate (22).

14. The measurement method (100) according to claim 13, wherein, during the step of arranging said second plate (22) at a distance (D) from said first plate (21), the second plate (22) is not placed in contact with said substance (1), thus leaving an air layer between said substance (1) and the second plate (22) and the first plate (21) is placed not in contact with said substance (1), thus leaving an air layer between said substance (1) and said first plate (21);
and wherein, in said converting step (108), said electric permittivity ($\varepsilon$) of the substance (1) is obtained by using the equation:

$$F = \frac{1}{2}\varepsilon_0\varepsilon_{r1}S\frac{(\varepsilon_{r2}\Delta V)^2}{(\varepsilon_{r1}d_2 + 2\varepsilon_{r2}d_1)^2} \quad \text{(Eq. 6)}$$

where:
$\varepsilon_0$ is the dielectric constant of vacuum equal to $8{,}9 \cdot 10^{-12}$ $C^2/(N \cdot m^2)$;
$\varepsilon_{r1}$ is the relative dielectric constant of air equal to 1.000589;
$\varepsilon_{r2}$ is a parameter of relative dielectric constant of the substance (1);
S is the area of the surface of said second plate (22);
$\Delta V$ is the potential difference (V) between said first plate (21) and second plate (22);
d1 is a thickness of said air layer;
d2 is a thickness of said substance measured in a perpendicular direction to an extension of said first plate (21) and second plate (22);
said distance (D) being equal to 2d1+d2 and said electric permittivity (E) being equal to $\varepsilon_0\varepsilon_{r2}$.

15. The measurement method (100) according to claim 1, further comprising a step of controlling the temperature of said electrorheology module (20) and said substance (1) provided during the measuring step (106) by using a control module of the temperature to investigate the dependency of the electric permittivity $\varepsilon$ of the substance (1) as a function of the set temperature, in order to determine the Curie temperature of the substance (1) itself.

* * * * *